US012719544B2

(12) United States Patent
Deng et al.

(10) Patent No.: US 12,719,544 B2
(45) Date of Patent: Aug. 25, 2026

(54) METHODS, ARCHITECTURES, APPARATUSES AND SYSTEMS FOR SIDELINK BEAM MANAGEMENT

(71) Applicant: InterDigital Patent Holdings, Inc., Wilmington, DE (US)

(72) Inventors: Tao Deng, New York, NY (US); Moon Il Lee, Melville, NY (US); Martino Freda, Laval (CA); Tuong Hoang, Montreal (CA); Young Woo Kwak, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 294 days.

(21) Appl. No.: 18/706,507

(22) PCT Filed: Nov. 1, 2022

(86) PCT No.: PCT/US2022/048556

§ 371 (c)(1),
(2) Date: May 1, 2024

(87) PCT Pub. No.: WO2023/081139

PCT Pub. Date: May 11, 2023

(65) Prior Publication Data

US 2024/0421876 A1 Dec. 19, 2024

Related U.S. Application Data

(60) Provisional application No. 63/275,195, filed on Nov. 3, 2021.

(51) Int. Cl.
*H04W 72/25* (2023.01)
*H04B 7/06* (2006.01)
*H04W 72/044* (2023.01)

(52) U.S. Cl.
CPC ........ *H04B 7/0626* (2013.01); *H04W 72/046* (2013.01); *H04W 72/25* (2023.01)

(58) Field of Classification Search
CPC ............. H04W 72/231; H04W 72/046; H04W 72/0446; H04W 72/25; H04W 72/23;
(Continued)

(56) References Cited

U.S. PATENT DOCUMENTS

2020/0260231 A1 8/2020 Ganesan et al.
2022/0110143 A1* 4/2022 Ganesan ............... H04W 72/20
2024/0007230 A1* 1/2024 He ........................ H04L 1/0061

FOREIGN PATENT DOCUMENTS

WO WO 2021096977 A1 5/2021

OTHER PUBLICATIONS

LG Electronics, "New WID on NR sidelink enhancement", 3GPP Tdoc RP-193231, 3GPP TSG RAN Meeting #86, Sitges, Spain, Dec. 12, 2019, 6 pages.

* cited by examiner

*Primary Examiner* — Wei Zhao
(74) *Attorney, Agent, or Firm* — Flaster Greenberg P.C.

(57) ABSTRACT

Beam management may be coordinated by a centralized coordinating entity, e.g., by a gNB, that configures and schedules Channel State Information Reference Signal, CSI-RS, transmissions for beam measurement and reporting. This centralized coordinating entity may not be available for Wireless Transmit-Receive Units, WTRUs, in a SideLink, SL, mode of operation, where resource allocation is performed by WTRUs in a distributed manner. WTRU procedures for establishing and updating an SL TCI state association are disclosed, including determining a spatial domain filter to use for an SL transmission. In these WTRU procedures, a WTRU may perform CSI-RS transmissions in an SL slot, e.g., multiplexed with a PSCCH/PSSCH transmission.
(Continued)

The WTRU may receive, in reply, CSI reporting information comprising a spatial domain filter. For further SL TB transmissions for the SL, the WTRU may use the spatial domain filter.

15 Claims, 13 Drawing Sheets

(58) Field of Classification Search
CPC .. H04W 72/04; H04W 72/044; H04B 7/0626; H04B 7/062
See application file for complete search history.

100
108
PSTN
112
Other
Networks
106
Core Network
110
Internet
104
RAN
114a
114b
116
116
116
116
116
102a
102b
102c
102d

| SL TCI State Index | SL TCI State Value | Associated SL Identification Information | Associated Spatial Domain Filter | Association Timer |
|---|---|---|---|---|
| 0 (Default) | (Pre) Configured or CSI-RS Index | None | (Pre) Configured or the One Used for the SL Signals Indicated by the Value of TCI State | None |
| 1,2,…,N Where N is (Pre)configured | One or Multiple SSB Index or CSI-RS Index or PT-RS Index | Unicast and a Pair of UE Source and Destination IDs or Groupcast and a UE Destination ID or Broadcast and a UE Destination ID | The One(s) Used for the Transmission of the SL Signal(s) Indicated by the Value of TCI State | Start Value Set based on QoS Requirement and MCR of the SL TB, UE Distance, RSRP, UE Speed, etc. |

Fig. 4

METHODS, ARCHITECTURES, APPARATUSES AND SYSTEMS FOR SIDELINK BEAM MANAGEMENT

CROSS-REFERENCE TO RELATED APPLICATIONS

This application is a U.S. National Stage Application under 35 U.S.C. 371 of International Patent Application No. PCT/US2022/048556, filed 1 Nov. 2022, which claims the benefit of U.S. Provisional Patent Application No. 63/275,195 filed Nov. 3, 2021, which is incorporated herein by reference in its entirety.

TECHNICAL FIELD

The present disclosure is generally directed to the fields of communications, software and encoding, including, for example, to methods, architectures, apparatuses, systems directed to SideLink (SL) Beam Management.

BACKGROUND

The design of R16 V2X (Vehicular communications) is mainly targeted at SL operation in FR1 (410 MHz-7.125 GHz). The support of FR2 (24.25 GHz-52.6 GHz) does not lead to specific features in R16 V2X specification, except for the SL PT-RS transmission. To support advanced V2X use cases such as extended sensors and advance driving, it has become increasingly important to enable and optimize SL FR2 operation to meet the related data rate and latency requirements. SL beam management (BM) as an integral feature of FR2 design framework is studied and designed for future releases of 3GPP SL specification and SL BM may encompass, for example, procedures of beam measurement, beam reporting, beam pairing and beam monitoring.

SUMMARY

According to one aspect of the present disclosure, embodiments of methods implemented by a Wireless Transmit-Receive Unit device are described and claimed in the appended claims.

According to a further aspect of the present disclosure, embodiments of a first Wireless Transmit-Receive Unit device are described and claimed in the appended claims.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref") in the FIGS. indicate like elements, and wherein:

FIG. 4 is a table for SL Transmission Configuration Indication (TCI) state association;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-ID, where various elements of the network may utilize, perform, be arranged in accordance with and/or be adapted and/or configured for the methods, apparatuses and systems provided herein.

FIG. 1 is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

Figure 1A:
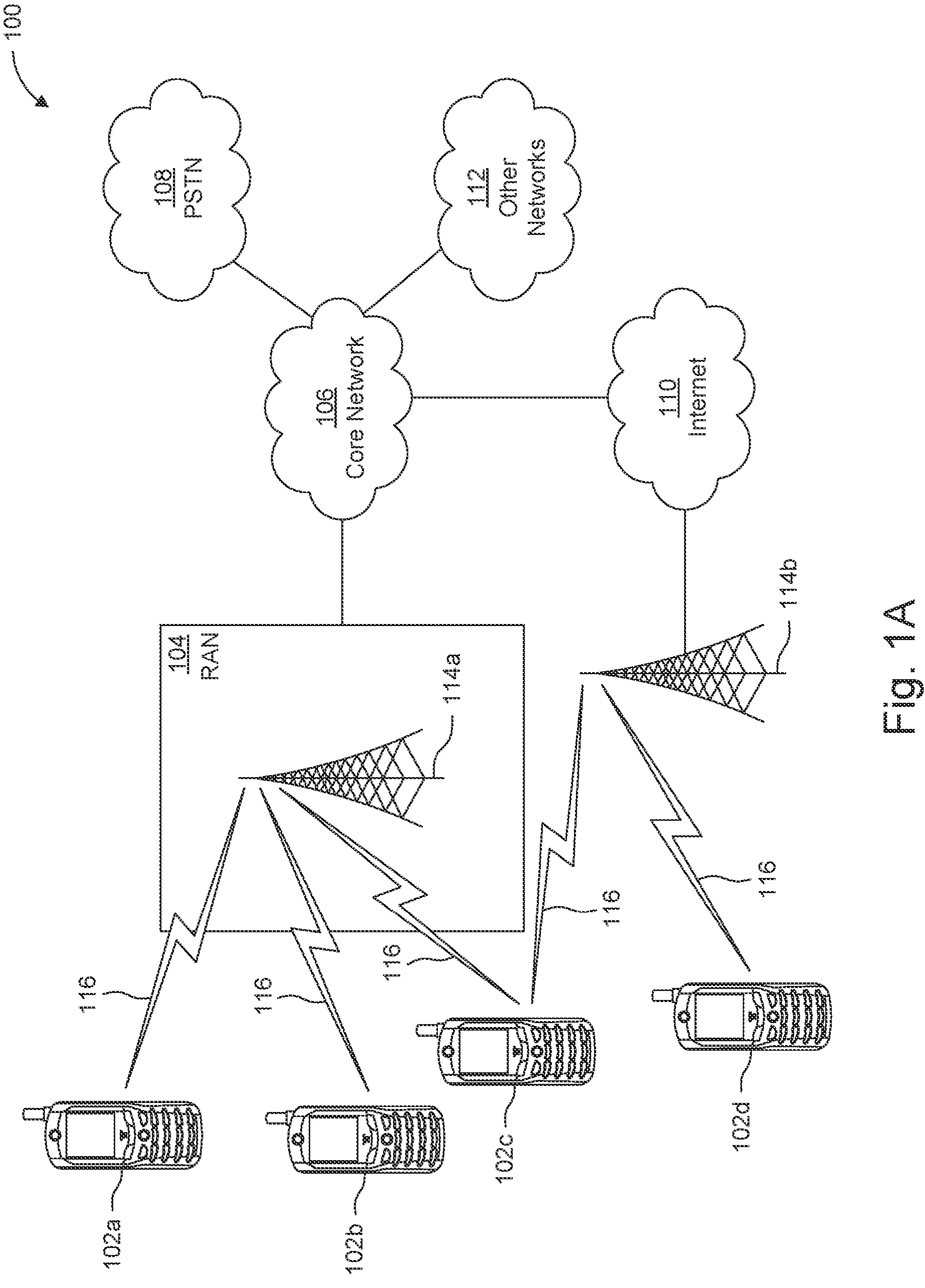
FIG. 1A is a system diagram illustrating an example communications system.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (WTRU), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. TA, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. TA, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. TA may be configured to communicate with the base station 114*a*, which may employ a cellular-based radio technology, and with the base station 114*b*, which may employ an IEEE 802 radio technology.

Figure 1B:
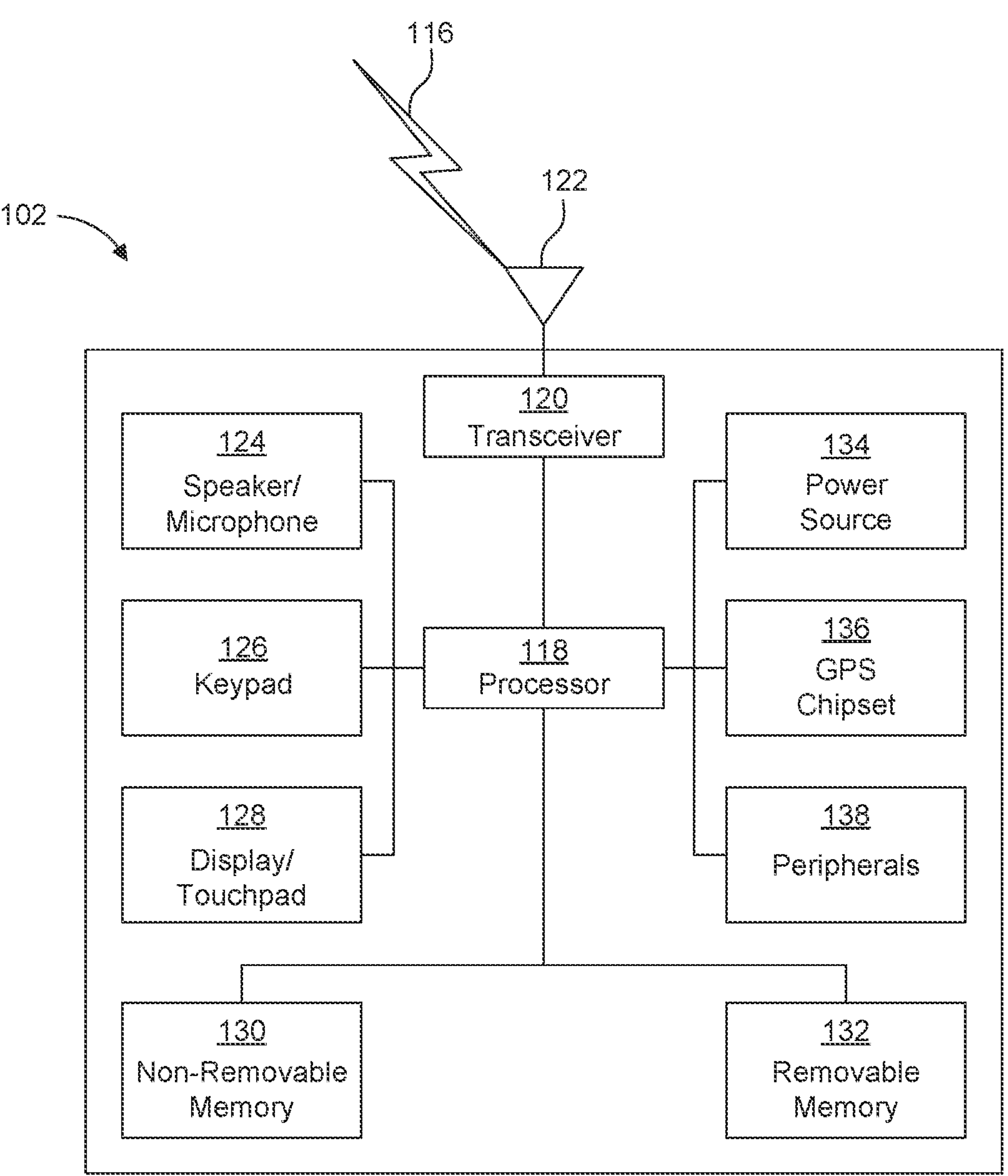
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
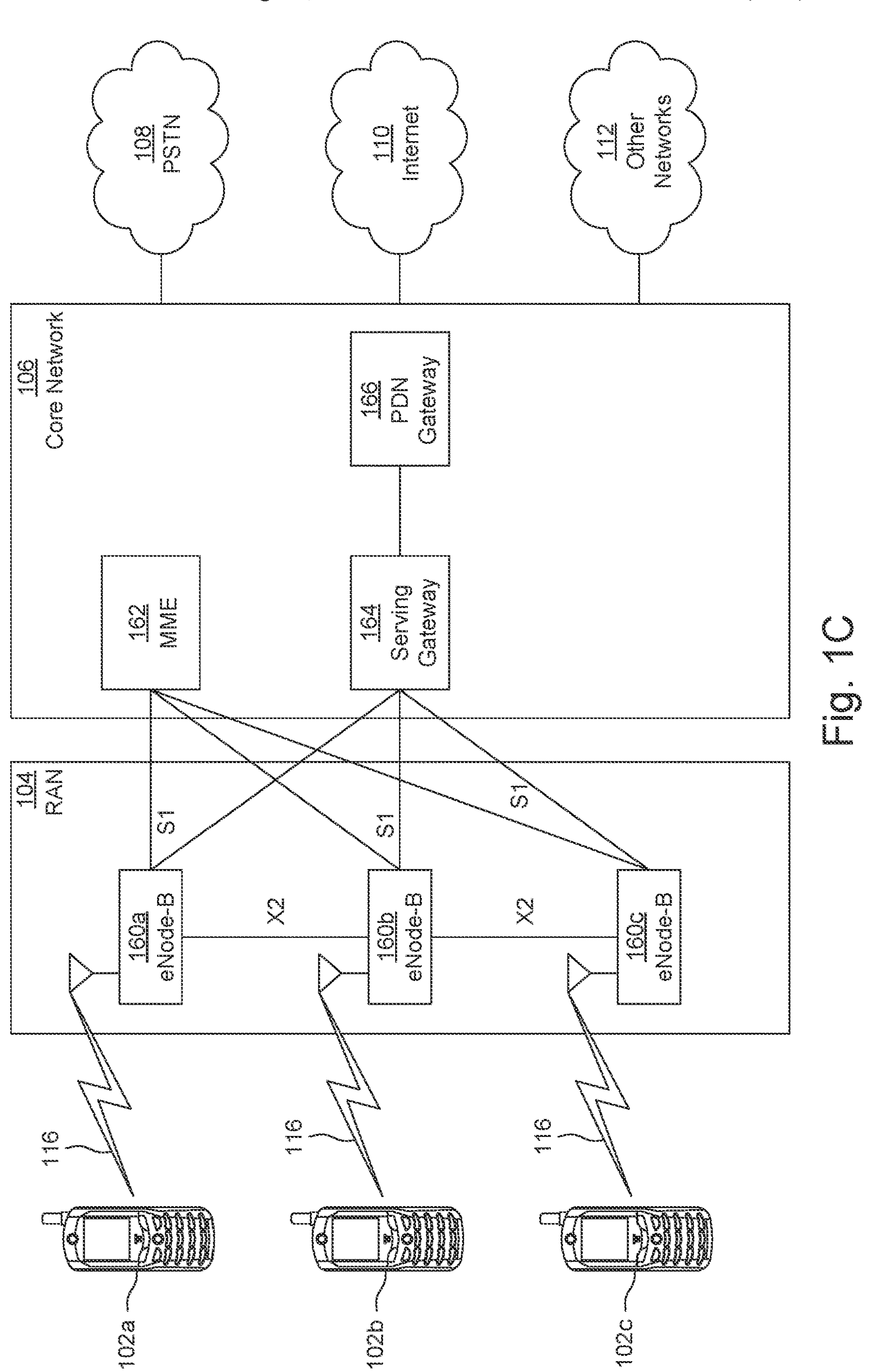
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example, in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
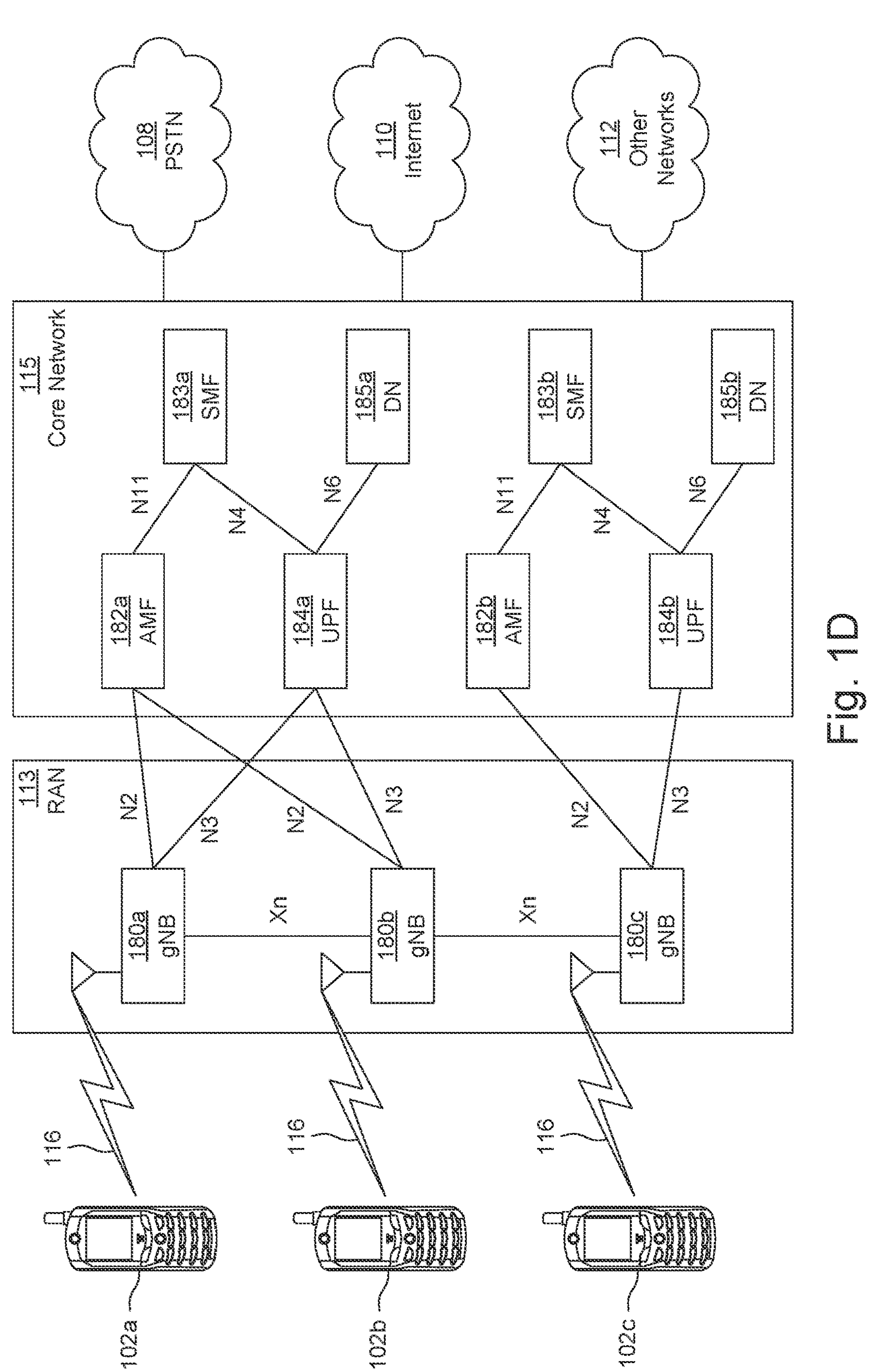
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In anon-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-ID, and the corresponding description of FIGS. 1A-ID, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

SL Operation in FR2

The design of R16 V2X (Vehicular communications) is mainly targeted at SL operation in FR1 (410 MHz-7.125 GHz). The support of FR2 (24.25 GHz-52.6 GHz) does not lead to specific features in R16 V2X specification, except for the SL PT-RS transmission. To support advanced V2X use cases such as extended sensors and advance driving, it has become increasingly important to enable and optimize SL FR2 operation to meet the related data rate and latency requirements. SL beam management (BM) as an integral feature of FR2 design framework is studied and designed for future releases of 3GPP SL specification and SL BM may encompass, for example, procedures of beam measurement, beam reporting, beam pairing and beam monitoring.

Overview

NR Uu Beamforming Framework

With beamforming, a WTRU can transmit or receive a physical channel or reference signal using a spatial domain filter. As a result, the transmitted or received energy is focused in an outgoing or incoming direction, respectively. The term "beam" is used to refer to a spatial domain filter or a spatial transmission or reception direction using a spatial domain filter.

Beam management design including the determination of a spatial domain filter by a WTRU for transmission and reception is specified in 3GPP Uu standard based on Quasi-CoLocation (QCL) relationship between two channels/signals and Transmission Configuration Indication (TCI) state to indicate such QCL relationship. NR Uu is an interface for cellular communication between device and base station, defined in 3GPP. NR Uu supports uplink unicast communication from device to base station as well as downlink unicast or multicast communication from base station to device.

A WTRU can receive a downlink channel or signal (target) using the same spatial domain filter applied in a previous reception of another downlink channel or signal (reference). The target and reference downlink channel or signal can thus be considered as Quasi-CoLocated, or 'QCL-ed'/'QCL:ed' in short, (in terms of spatial RX parameters, i.e. Type D). Such a QCL relationship can be conveyed and indicated using a TCI state.

A Physical Downlink Control Channel (PDCCH) and Physical Downlink Shared Channel (PDSCH) transmission configuration includes a DL TCI state indication, of which the value can be a synchronization signal (Synchronization Signal Block (SSB)) or reference signal (CSI-RS) that is transmitted using same spatial domain filter as the one used for the PDCCH and PDSCH transmission.

For PDCCH reception, a set of DL TCI states are configured via higher layer signaling and one of the configured TCI states is activated and indicated in a MAC CE (MAC Control Element) for a PDCCH. A WTRU receives the PDCCH using the same spatial domain filter as the one used to receive the Quasi-Colocated SSB or CSI-RS indicated in the TCI state of the PDCCH transmission.

To receive a dynamically scheduled PDSCH, a set of DL TCI states for PDSCH transmissions are activated in a MAC CE and the TCI state of a PDSCH is indicated in a PDCCH (DCI format 1_1 (DCI=Downlink Control Information)) associated with the PDSCH. When the time between the PDCCH and associated PDSCH is smaller than a pre-configured timeDurationForQCL, the TCI state of the PDCCH transmission is applied to the PDSCH transmission, i.e. a WTRU uses the same spatial domain filter to receive both PDCCH and associated PDSCH.

Similarly, a WTRU can transmit an uplink channel or signal (target) using the same spatial domain filter applied in a previous reception of a downlink channel or signal (DL reference) or a previous transmission of an uplink channel signal (UL reference). A WTRU may transmit a physical channel or signal using the same spatial domain filter as the one used to receive a SSB or CSI-RS or the one used previously to transmit a Sounding Reference Signal (SRS).

The spatial domain filter to apply for an SRS and Physical Uplink Control Channel (PUCCH) transmission is indicated in spatialRelationInfo configured via Radio Resource Control (RRC) signaling. For a codebook-based Physical Uplink Shared Channel (PUSCH) transmission, a WTRU applies a spatial domain filter based on Transmitted Precoding Matrix Indicator (TPMI) and number of layers indicated in PDCCH (DCI format 0_1) scheduling the PUSCH transmission. For a non-codebook-based PUSCH transmission, the spatial domain filter is the one previously used for an SRS transmission performed in a resource indicated in an SRS Resource Indication (SRI) included in the PDCCH (DCI format 0_1) scheduling the PUSCH transmission.

Infeasibility to Rely on a Centralized Coordinating Entity for SL Beam Management NR Uu beam management procedures are coordinated by a centralized scheduling entity of a gNB. A gNB configures and schedules CSI RS transmissions for beam measurement and reporting. SRS transmissions are configured and measured by the gNB for UL beam management. This centralized coordinating entity is not available in Mode 2 SL operation, because the Mode 2 resource allocation is performed by WTRUs in a distributed manner. In Mode 1 SL operation, resource allocation is performed by gNB, but to enable the beam management in Mode 1 will require significant signaling (especially in UL) for the reporting of SL beam measurement from WTRUs to the gNB. Mode 1 and Mode 2 refer to NR V2X SL communication modes, and resource allocation is different for each communication mode. In Mode 1, the WTRUs are assisted by the gNB and use dedicated resources for data transmission. In Mode 2, WTRUs randomly select radio resources from a resource pool that was previously sent by the gNB.

Operation of Multiple Uncoordinated SLs by One WTRU

In NR Uu, a WTRU operates one DL and one UL with one entity of gNB, which performs beam management accordingly. A WTRU always receives from a gNB and thus the QCL and DL TCI state information (e.g., the semi-statical PDCCH TCI state) can be applied in a DL slot without ambiguity. However, the number of SLs operated by a WTRU can be large, depending on the V2X applications and services the WTRU subscribes to, and since the transmissions of these SLs are not coordinated, a WTRU does not have the a priori knowledge regarding from which WTRU and from which direction it will receive a SL transmission in a SL slot. Also, the WTRU is spatially limited by beamforming and may not be able to receive multiple Transport Blocks (TBs) in one Transmission Time Interval (TTI) as in R16 V2X design baseline.

No Stand-Alone and Periodic RS Transmissions in SL Baseline

Beam management procedures in NR Uu rely on periodic, Semi-Persistent Scheduling (SPS) and aperiodic reference signals to indicate a QCL relationship of a control or data channel. These RS transmissions enable measurement and reporting to establish and update a QCL relationship (as discussed in previous section "NR Uu Beamforming Framework"). The framework relies on the periodic SSB transmissions to establish a basic reference of QCL relationship, which can subsequently be used to indicate the TCI state of CSI-RS transmission. R16 V2X WTRUs normally do not perform such SSB transmissions (unless the WTRU becomes a SyncRef WTRU; in NR V2X, a WTRU can also transmit information for supporting synchronization in the sidelink. If it does, the WTRU serves as a synchronization reference and is referred to as a SyncRef WTRU) or any periodic RS transmissions. The only supported SL RS transmission is aperiodic CSI-RS with a PSSCH transmission.

In view of what has been discussed in the preceding paragraphs, embodiments are proposed. First, in section A, WTRU procedures for establishing and updating a SL TCI state association is discussed. Second, in section B, WTRU procedures for determining a spatial domain filter to use for a transmission of SL TB are discussed. Third, in section C, WTRU procedures for determining a spatial domain filter to use for a reception of a SL TB are discussed. Fourth, in section D, WTRU procedures for determining a spatial domain filter of a HARQ feedback transmission are discussed. An embodiment to associate a SL TCS state with each SLs operated by a WTRU is introduced in Section A to enable a WTRU to apply beamforming optimal for each link. Section B includes embodiments to allow a WTRU to embed CSI-RS transmissions with data without centralized coordination by gNB for the purpose of beam management without relying on dedicated SL RS transmission. With the CSI-reporting based on the Section A and Section B, a WTRU may perform beamformed transmission and reception of SL channels as described in embodiments in Section C and D.

A—WTRU Procedures for Establishing and Updating a SL TCI State Association

A1—SL Identification Information

A WTRU may be (pre)configured with SL identification information of a SL TB. The SL TB may be associated with a V2X service and/or V2X application. When a WTRU subscribes to the V2X service and/or V2X applications, the WTRU may transmit and receive the associated SL TBs with the SL identification information.

The SL identification information may include a cast type indicator, a Source ID and/or a Destination ID. A unicast SL identification information may include a unicast indicator and a pair of Source and Destination ID. A groupcast SL identification information may include a groupcast indicator and a Destination ID. A broadcast SL identification information may include a broadcast indicator and a Destination ID. A WTRU may indicate the SL identification information of a SL TB in a Sidelink Control Information (SCI) transmitted in a PSCCH associated with the PSSCH transmission of the SL TB.

A2—SL TCI state

A WTRU may be (pre)configured with a set of SL TCI states to indicate a QCL relationship between SL signals and/or channels. A WTRU may assign the following values to a SL TCI state: SL SSB index (see following section A2.1 "SL SSB index"); SL CSI-RS index (see section A2.2 "SL CSI-RS index"); SL PT-RS index (see section A2.3 "SL PT-RS index").

A2.1—SL SSB Index

A WTRU may transmit a set of SL SSBs when a WTRU is SyncRef WTRU, i.e., a source of synchronization of other WTRUs. A SyncRef WTRU may perform a (pre)configured number of SL SSBs according to a (pre)configured periodicity. A WTRU may assign a SL SSB index to each periodically-transmitted SL SSB and perform each of such SL SSB using different spatial domain filter. A SL SSB index may thus indicate a spatial domain filter used for the transmission of the SSB.

According to an embodiment, a WTRU may indicate a SL SSB index in SL Physical Broadcast Channel (PBCH). In another embodiment, a WTRU may indicate a SL SSB index based on a set of (pre)configured SL PBCH Demodulation Reference Signal (DM-RS) sequences and each SL PBCH DM-RS sequence may indicate a SL SSB index. Alternatively, a WTRU may indicate a number of SL SSB index bits (e.g., Most Significant Bits (MSBs)) using a SL PBCH DM-RS and the remaining SL SSB index bits in SL PBCH.

A 2.2—SL CSI-RS Index

Figure 2:
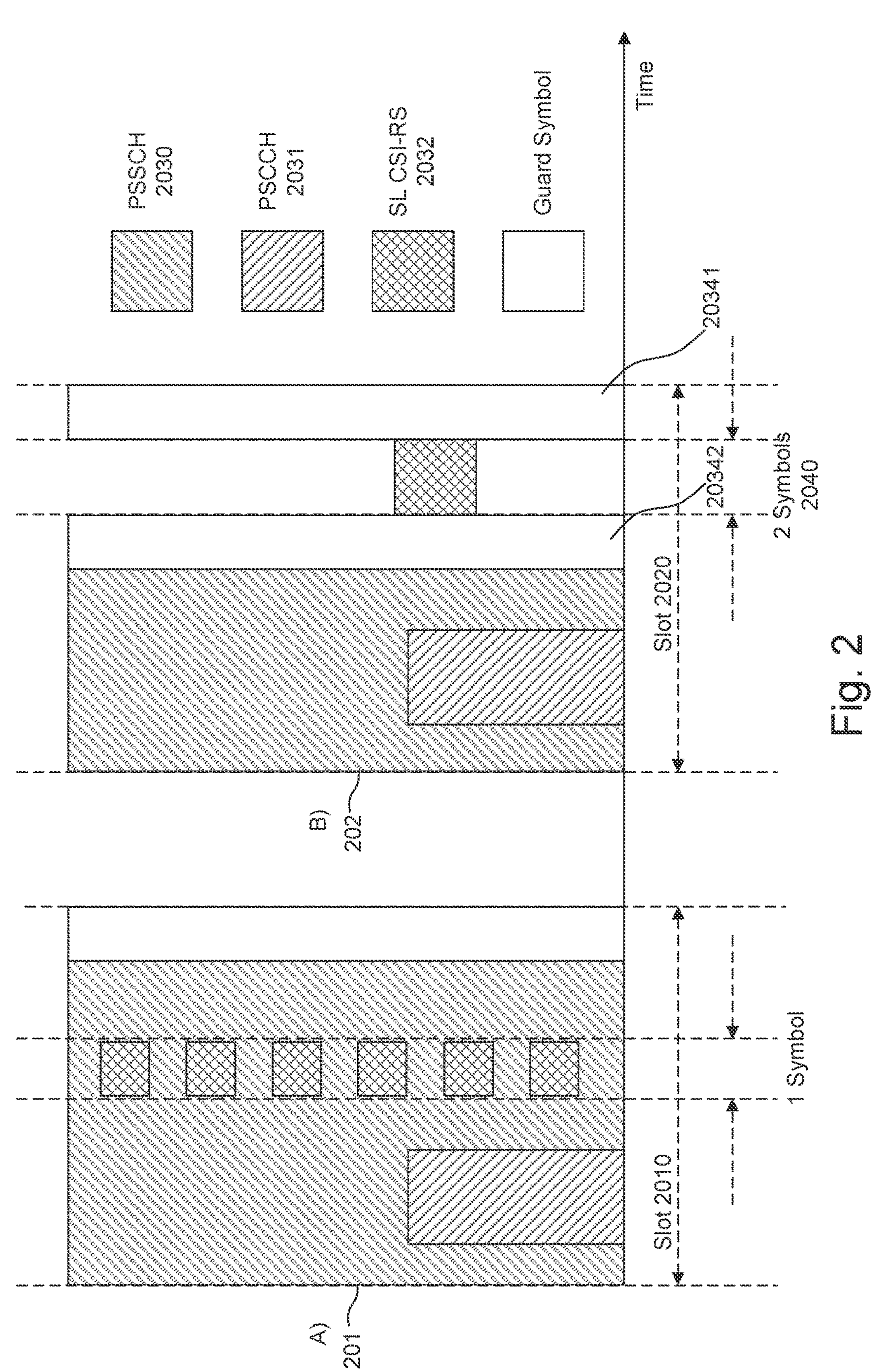
FIG. 2 shows two SL Channel State Information-Reference Signal (CSI-RS) resource configuration Types A and B.

FIG. 2 shows two SL Channel State Information-Reference Signal (CSI-RS) resource configuration Types A and B. A WTRU may perform a SL CSI-RS transmission 2032 in a SL slot 2010, 2020, multiplexed with a PSCCH (2031)/PSSCH (2030) transmission. A WTRU may be (pre)configured with a set of SL CSI-RS resource configurations in a resource pool. A SL CSI-RS transmission may be multiplexed with PSSCH transmission in both time and frequency domain in a SL slot, as shown in configuration A, reference 201. The SL CSI-RS resources may be within the PSSCH resources. This SL CSI-RS resource configuration may be referred to as Type A SL CSI-RS resource configuration in this document. A SL CSI-RS transmission based on Type A resource configuration may be Quasi-Colocated with PSCCH/PSSCH transmission in the same SL slot 2010 and a WTRU may use the same spatial domain filter for the PSCCH/PSSCH and SL CSI-RS transmissions.

In another embodiment, a SL CSI-RS transmission may be multiplexed with PSCCH/PSSCH transmission in time domain only in a SL slot, as shown in configuration B, reference 202. The SL CSI-RS resources may be outside the PSSCH resource in a SL slot. This SL CSI-RS resource configuration may be referred to as Type B CSI-RS resource configuration in this document. A SL CSI-RS transmission based on Type B resource configuration may not be Quasi-Colocated with PSCCH/PSSCH transmission in the same SL slot. When they are Quasi-Colocated, a WTRU may use the same spatial domain filter for the PSCCH/PSSCH and SL CSI-RS transmissions. When they are not Quasi-Colocated, a WTRU may use different spatial domain filter for the PSCCH/PSSCH and SL CSI-RS transmissions.

A WTRU may be (pre)configured with a resource pool with SL CSI-RS Type A and/or Type B configuration. A Type A SL CSI-RS resource (pre)configuration may include at least the following information: SL CSI-RS symbol(s) within the PSSCH symbols, e.g., symbol indices to indicate which symbol(s) may be allocated for CSI-RS transmission; SL CSI-RS sub-carrier(s) within the PSSCH Physical Resource Blocks (PRBs), e.g. a density of CSI-RS sub-carrier(s) within the PSSCH PRBs to indicate which sub-carrier(s) in each PSSCH PRB may be allocated for SL CSI-RS transmission at the SL CSI-RS symbol(s); SL CSI-RS sequence, e.g., a sequence type and a set of orthogonal sequences.

A type B SL CSI-RS resource (pre)configuration may include the following information: SL CSI-RS symbol(s) in a SL slot, e.g., a set of contiguous symbols in a SL slot (pre)configured for SL CSI-RS transmission. FIG. 2 shows two SL Channel State Information-Reference Signal (CSI-RS) resource configuration Types A and B. As shown in the example, the two SL symbols 2040 before the guard symbol 20341 at the end of a SL slot 2020 may be (pre)configured for SL CSI-RS transmission. The SL CSI transmission may be repeated over the two symbols so the transmission at the 1st symbol may be applied for Automatic Gain Control (AGC) convergence. Another guard symbol 20342 may be (pre)configured before the SL CSI-RS symbols for SL TX/RX switching. A periodicity (X) of such SL CSI-RS slot including SL CSI-RS symbol(s) may be (pre)configured in a resource pool. For example, when X equals to 2, one SL slot every two SL slots may include (pre)configured SL CSI-RS symbols for SL CSI-RS transmission. A type B SL CSI-RS resource (pre)configuration may further include the following information: SL CSI-RS frequency allocation, e.g., a set of SL CSI-RS PRBs in a resource pool (pre) configured for CSI-RS transmission. A WTRU may map each SL CSI-RS PRB to a sub-channel in a resource pool. The mapping may be based on the number of (pre)configured CSI-RS PRB, the number of (pre)configured sub-channels of a resource pool and the CSI-RS periodicity (X). Each SL CSI-RS transmission may be performed over one PRB. CSI-RS sequence, e.g., a sequence type and a set of orthogonal sequences.

A WTRU may perform a SL CSI-RS transmission using a spatial domain filter and indicate a SL CSI-RS index in a SCI transmitted in a PSCCH associated with the PSSCH transmission of a SL TB in the same SL slot. A SL CSI-RS index may thus indicate a spatial domain filter used for the SL CSI-RS transmission.

A2.3—SL PT-RS Index

A WTRU may perform a SL Phase Tracking Reference Signal (PT-RS) transmission in a SL slot multiplexed with a PSCCH/PSSCH transmission. A WTRU may be (pre)configured with a set of SL PT-RS resource configurations in a resource pool. A SL PT-RS transmission may be multiplexed with PSSCH transmission in both time and frequency domain in a SL slot and transmitted within the PSSCH resources. A WTRU may perform a SL PT-RS transmission using a spatial domain filter and indicate a SL PT-RS index in a SCI transmitted in a PSCCH associated with the PSSCH transmission of a SL TB in the same SL slot. A SL PT-RS index may thus indicate a spatial domain filter used for the SL PT-RS transmission.

A3—SL TCI State Association

A WTRU may establish and update a SL TCI state association including at least a SL TCI state value, associated SL identification information (cast type and WTRU source and/or destination ID), associated spatial domain filter (one used for the transmission of the signal indicated by the TCI state value) and the association timer. FIG. 4 is a table for SL Transmission Configuration Indication (TCI) state association and illustrates an example of such association. The SL identification information associated with a SL TCI state may be a pair of WTRU source and destination ID of a unicast SL TB, a WTRU destination ID of a groupcast SL TB or a WTRU destination ID of a broadcast TB.

When a SL TCI state association is established or updated, a TX WTRU may determine a PSCCH/PSSCH transmission of a SL TB may be Quasi-Colocated with the transmission of the SL signal (e.g., SL SSB or SL CSI-RS or SL PT-RS) indicated by a SL TCI state associated with the SL identification information of the SL TB. Accordingly, a TX WTRU may perform a PSCCH/PSSCH transmission of the SL TB using a spatial domain filter indicated by the SL TCI state associated with the SL identification information of the SL TB (which is used for the transmission of a SL signal indicated by the SL TCI state) when the association timer is running, i.e. has not expired. A TCI state may be associated with a set of spatial domain filters for groupcast and broadcast SL identification information.

A WTRU may be (pre)configured with one pair of WTRU source and destination ID for each direction of a unicast link. A WTRU may thus transmit a SL TB with one pair of WTRU source and destination ID to the other WTRU on a unicast link and receive a SL TB a different pair of WTRU source and destination ID from the same WTRU on the same unicast link. The SL identification information for transmission of a SL TB and reception of a SL TB on a unicast link that may be (pre)configured for a same WTRU may be referred to SL TX identification information and SL RX identification information in this document, respectively.

In one embodiment, a WTRU may be indicated in RRC signaling both SL TX and SL RX identification information each unicast link. A WTRU may thus determine a transmission of a SL TB with a SL TX identification information of a unicast link and a reception of a SL TB with a SL RX identification information of the same unicast link may be from and to one same WTRU, i.e., the peer WTRU of the unicast link. Thus, due to channel reciprocity, the wireless channel experienced by the transmission may be the same as the one experienced by the reception from the peer WTRU and the same spatial domain filter may be applied.

Therefore, a RX WTRU may determine a PSCCH/PSSCH reception of a SL TB may be Quasi-Colocated with the transmission of a SL signal (e.g., SL SSB or SL CSI-RS or SL PT-RS) indicated by a SL TCI state when the SL identification information of the SL TB and the SL identification information associated with the SL TCI state are (pre)configured to a same WTRU. Such two SL identification information may be referred to as coupling SL identification information (pre)configured for one WTRU throughout this disclosure for conciseness (as indicated for example in FIG. 3). One such SL identification information may be referred to as the coupling SL identification information of the other. For a group or broadcast link, the coupling SL identification information may be the same WTRU destination ID.

Accordingly, a RX WTRU may perform a PSCCH/PSSCH reception of the SL TB using a spatial domain filter indicated by the SL TCI state associated with SL identification information coupling with the SL identification of the SL TB to receive, when the association timer is running, i.e., has not expired.

Figure 3:
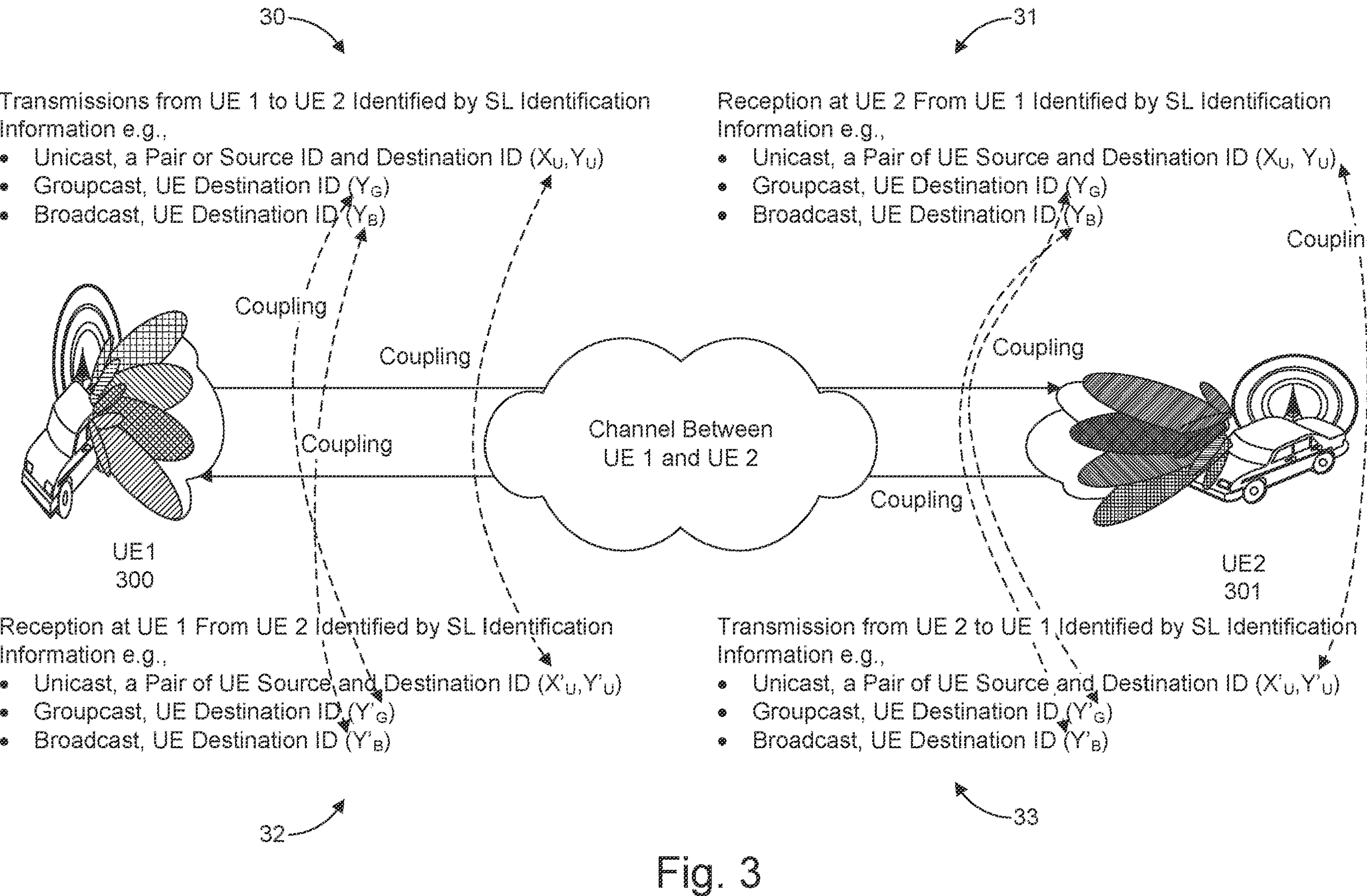
FIG. 3 shows a coupling between Transmit (TX) and Receive (RX) SL identification information of a same line between two WTRUs.

FIG. 3 shows a coupling between Transmit (TX) and Receive (RX) SL identification information of a same line between two WTRUs. Two WTRUs (UE1 300 and UE2 301) over a channel between UE1 and UE2 are depicted. Element 30 indicates transmissions via a channel from UE1 to UE2, identified by SL identification information, e.g., if unicast, a pair of source ID and destination ID (Xu, Yu); if groupcast, a UE destination ID (Yg); and if broadcast, a UE destination ID (Yb). Element 31 indicates reception via the channel at UE2 from UE1 identified by SL identification information, e.g., if unicast, a pair of source ID and destination ID (Xu, Yu); if groupcast, a UE destination ID (Yg); and if broadcast, a UE destination ID (Yb). Element 33 indicates a transmission via the channel from UE2 to UE1, identified by SL identification information, e.g., if unicast, a pair of source ID and destination ID (X'u, Y'u); if groupcast, a UE destination ID (Y'g); and if broadcast, a UE destination ID (Y'b). Element 32 indicates reception via the channel at UE1 from UE2 identified by SL identification information, e.g., if unicast, a pair of source ID and destination ID (X'u, Y'u); if groupcast, a UE destination ID (Y'g); and if broadcast, a UE destination ID (Y'b). Arrows drawn with broken lines indicate couplings, e.g., between (Xu, Yu) and (X'u, Y'u), between Yg and Y'g, and between Yb and Y'b.

A3.1—Association Timer

A WTRU may maintain an association timer for each SL TCI state association. A WTRU may set the association timer to a (pre)configured value (a start timer value) when a SL TCI state association is established or updated. The start timer value may indicate a time period during which the wireless channel experienced by the transmission of the SL signal indicated in the SL TCI state may be considered unchanged. As a result, when the association timer is running, the spatial domain filter used for the transmission of the indicated SL signal may also be used for a PSCCH/PSSCH transmission of a SL TB with the SL identification information associated with the SL TCI state. When the association timer expires, the wireless channel may be considered changed and the spatial domain filter associated with the SL TCI state may no longer be applicable. A WTRU may perform a SL TCI state association update accordingly.

A WTRU may be (pre)configured with a set of timer values and determine a timer start value for an established or updated SL TCI state association based on the QoS requirement (priority, reliability, latency, etc.) and Minimum Communication Range (MCR) requirement of the SL TB with the SL identification information associated with the SL TCI state, WTRU distance (the distance between the WTRU and the target WTRU of the transmission of the SL TB), Reference Signal Received Power (RSRP) information of the SL transmissions performed for the SL TCI state association establishment or update, WTRU speed, etc.

High priority and large MCR requirement may require a WTRU to update a SL TCI state association more frequently and thus a small timer value may be applied. A wireless channel may be favorable for transmission and reception when WTRU distance is short and/or the RSRP value is high. Accordingly, a large timer value may be set for short WTRU distance or high RSRP. When WTRU speed is high, wireless channel transmit- and receive conditions may vary frequently and a small timer value may be used.

In one embodiment, each (pre)configured timer start value may be associated with QoS requirement (e.g., a priority) and a WTRU may select a SL TCI association timer value according to QoS requirement of the SL TB with SL identification information associated with the SL TCI state. In another embodiment, each (pre)configured timer start value may be associated with a MCR requirement and a WTRU may select a SL TCI association timer value according to the MCR requirement of the SL TB with SL identification information associated with the SL TCI state.

In addition, each (pre)configured time value may be associated with a range of WTRU distance or a WTRU distance threshold. A WTRU may select a SL TCI association timer value associated with a range corresponding to a calculated WTRU distance. Also, a WTRU may select a SL TCI association timer value associated with a WTRU distance threshold when a calculated WTRU distance exceeds the threshold. In another embodiment, each (pre)configured time value may be associated with a WTRU speed threshold and a WTRU may select a SL TCI association timer value associated with the WTRU speed threshold when the WTRU's speed exceeds the threshold.

A3.4—Default SL TCI State

A WTRU may determine a default SL TCI state, e.g., denoted as SL TCI state 0 in FIG. 4, without association with SL identification information. The purpose of the default SL TCI state is to provide a spatial domain filter configuration for a PSCCH/PSSCH transmission or reception using a broad TX or RX beam without performing a SL TCI state association establishment or update. When the default SL TCI state is applied, a WTRU may perform a PSCCH/PSSCH transmission of a SL TB using the spatial domain filter indicated by a default SL TCI state.

A default TCI state value may be (pre)configured to indicate a default spatial domain filter based on WTRU beamforming capability. For example, a WTRU may assign a (pre)configured value to indicate a spatial domain filter based on a small antenna panel for transmission and reception using a broad beam. When such a spatial domain filter is used for SL CSI-RS transmissions, the WTRU may assign the SL CSI-RS index to the value of a default SL TCI state. In another embodiment, when a WTRU performs both FR1 and FR2 SL operation, a WTRU may assign an index of a SL CSI-RS transmitted in FR1 to the value of a default SL TCI state.

A4—Triggering for SL TCI State Association Establishment or Update

A4.1—Triggering a SL TCI State Association Establishment or Update Based Requested SL CSI and/or SL SSB Reporting A TX WTRU may trigger a SL TCI state association establishment when the TX WTRU has a SL TB to transmit and the SL identification information of the SL TB is not associated with any SL TCI state. A TX WTRU may perform a SL TCI state association establishment based on SL CSI and/or SL SSB reporting as described in this document.

A TX WTRU may trigger a SL TCI state association update when the TX WTRU has a SL TB for transmission and the association timer of the SL TCI state associated with the SL identification information of the SL TB has expired and the remaining Packet Delay Budget (PDB) of the SL TB is larger than a (pre)configured threshold. A TX WTRU may perform a SL TCI state association update based on requested SL CSI and/or SL SSB reporting as described in this disclosure.

A TX WTRU may trigger a SL TCI state association update when the TX WTRU receives a SL TCI state association update request from a WTRU who is an intended RX WTRU of a SL TB from the TX WTRU with the SL identification information associated with the SL TCI state. A TX WTRU may perform a SL TCI state association update based on requested SL CSI and/or SL SSB reporting as described in this document.

A TX WTRU may trigger a SL TCI state association update when the number of HARQ NACK corresponding to the PSCCH/PSSCH transmissions of the SL TB with the SL identification associated with the SL TCI state exceeds a (pre)configured threshold. A TX WTRU may be (pre)configured with a set of such thresholds associated with QoS requirement of the SL TB (e.g., priority), MCR requirement of the SL TB, and/or SL CBR measurement. This triggering may allow a TX WTRU to update the SL TCI state when the association timer is running in the scenarios where a wireless channel is blocked.

A4.2—Triggering a SL TCI State Association Update Based on Received PSCCH/PSSCH Transmissions A RX WTRU may trigger a SL TCI state association update when the RX WTRU receives PSCCH/PSSCH transmissions of a SL TB and the SL identification information of the received SL TB and SL identification information associated with the SL TCI state are coupling information for a unicast link. A RX WTRU may re-set the association timer of the SL TCI state upon a successful reception of such a SL TB.

A4.3—Triggering a SL TCI State Association Establishment or Update Based on Received Periodic SL SSB Reporting When a WTRU is a SyncRef WTRU, the WTRU may perform periodic SL SSB transmissions as discussed in section "SL SSB index". A WTRU synchronizing with a SyncRef WTRU may be (pre)configured to perform a periodic SSB reporting to the SyncRef WTRU. A WTRU may indicate the index of the SL SSB the WTRU is synchronizing with in the periodic SSB reporting. A WTRU may provide additional information including e.g., SL identification information, zone ID and measured SL PBCH DM-RS RSRP value.

In one embodiment, a WTRU may include a periodic SL SSB reporting information in MAC CE or RRC signaling. In another embodiment, a WTRU may indicate SL SSB reporting information in a physical layer channel, e.g., in a SCI in a PSCCH/PSSCH transmission. In a further embodiment, a WTRU may indicate SL SSB reporting information using a sequence transmitted in a physical layer feedback channel (PSFCH). A WTRU may be (pre)configured with a set of sequences and each sequence may indicate a SL SSB index. Also, a WTRU may be (pre)configured with a set of PRBs for the PSFCH transmission and determine a PRB for a PSFCH transmission based on the SL SSB index.

When receiving such a periodic SL SSB reporting, a SyncRef WTRU may determine to establish or update a SL TCI state associated with SL identification information coupling with the SL identification information included in the SL SSB reporting information. A SyncRef WTRU may assign the received SL SSB index as the value of the SL TCI state value and start the association timer. A SyncRef WTRU may determine the association timer start value as discussed in section "Association timer" based on the priority and MCR requirement of a SL TB with the coupling SL identification information and the zone ID and SL PBCH DM-RS RSRP value included in the SL SSB reporting information. A SyncRef WTRU may determine a WTRU distance between itself and the WTRU transmitting the periodic SL SSB reporting based on the Zone ID including in the SL SSB information and its own Zone ID.

A5—Requested SL CSI Reporting for SL TCI State Association Establishment or Update]

When a TX WTRU triggers SL TCI state association establishment or update as discussed in section "Triggering a SL TCI state association establishment or update based requested SL CSI and/or SL SSB reporting", the TX WTRU may perform a requested SL CSI reporting based on SL CSI-RS transmissions with PSCCH/PSSCH transmissions of a SL TB with SL identification information associated with the SL TCI state.

A5.1—SL CSI-RS Transmission Using Type A SL-CSI RS Configuration

In one embodiment, a TX WTRU may determine to use Type A SL CSI-RS resource configuration, e.g. when Type A resource configuration is enabled/configured in a resource pool. In another embodiment, when both Type A and Type B SL CSI-RS resource configurations are enabled/configured in a resource pool, a TX WTRU may determine to use Type A SL CSI-RS resource configuration when the priority of the SL TB exceeds a (pre)configured threshold (see for example FIG. 7B, 711—Yes, step 712). A high priority value indicates a low QoS requirement (e.g., priority, reliability, latency, etc.) and therefore a larger number of transmission errors due to using different spatial domain filter for PCCCH/PSSCH transmissions of a SL TB may be acceptable.

A TX WTRU may determine a set of different spatial domain filters ($N_{CSI\text{-}RS\text{-}index}$) to use for SL CSI-RS and PSCCH/PSSCH transmissions and associate a SL CSI-RS index with each determined spatial domain filter. The $N_{CSI\text{-}RS\text{-}index}$ spatial domain filters may be selected based on WTRU capability, e.g., among the maximum number of supported spatial domain filter $N_{CSI\text{-}RS\text{-}index\text{-}max}$. In another embodiment, a WTRU may be (pre)configured with $N_{CSI\text{-}RS\text{-}index}$ in a resource pool.

A WTRU may be (pre)configured with a minimum ($N_{min}$) and maximum re-transmission number ($N_{max}$) for transmissions of a SL TB in a resource pool. $N_{min}$ may be applied when a SL TB is transmitted in a SL slot with SL CSI-RS transmission for a SL TCI state association establishment or update. A TX WTRU may determine a number of SL CSI-RS/PSCCH/PSSCH transmissions ($N_{TX}$) including an initial transmission and re-transmissions of a SL TB according to $N_{TX}=N_{CSI\text{-}RS\text{-}index}\times M_{group}$ where $N_{min}<=N_{TX}<=N_{max}$ and $M_{group}$ is non-zero positive integer.

A TW WTRU may perform sensing using the $N_{CSI\text{-}RS\text{-}index}$ determined spatial domain filter and obtain $N_{CSI\text{-}RS\text{-}index}$ sets of available candidate resources. Each set may be applied for resource selection for PSCCH/PSSCH transmissions performed in the same SL slot with the SL CSI-RS transmission with the index associated with the used spatial domain filter. As discussed in section "SL CSI-RS index", SL CSI-RS and PSCCH/PSSCH transmission are Quasi-Colocated in Type A SL CSI-RS configuration and thus a TX WTRU may perform resource selection for PSCCH/PSSCH transmissions based on the available candidate resource set corresponding to the SL CSI-RS index and subsequently determine SL CSI-RS resources within the selected PSSCH resource based on the SL CSI-RS resource (pre)configuration discussed in section "SL CSI-RS index".

Figure 5:
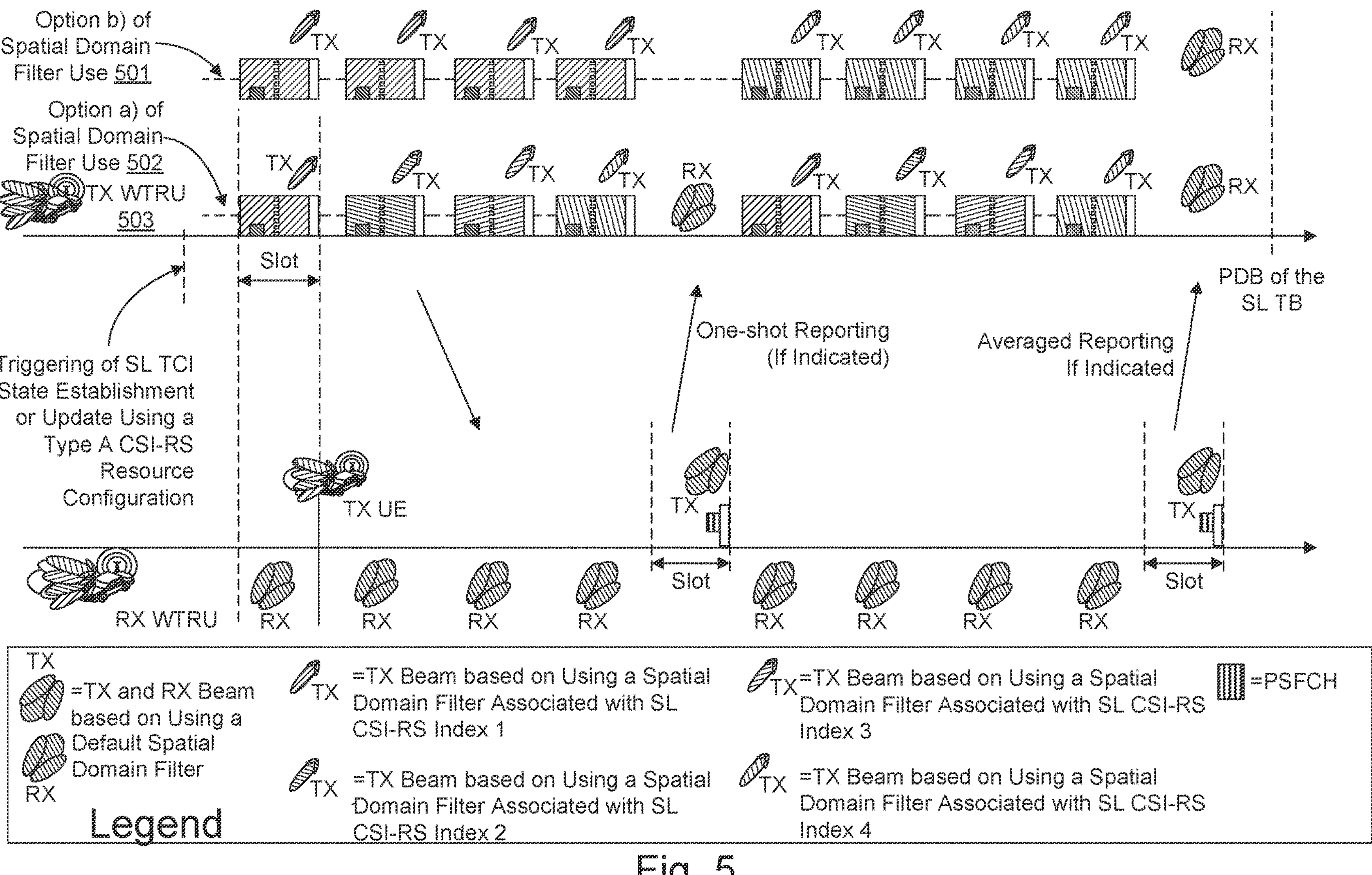
FIG. 5 shows requested SL CSI reporting using Type A SL CSI-RS resource configuration.

FIG. 5 shows requested SL CSI reporting using Type A SL CSI-RS resource configuration. In one embodiment shown as Option a) (reference 502) of spatial domain filter use, a TX WTRU 503 may perform each SL CSI-RS and PSCCH/PSSCH transmission using the set of the determined spatial domain filters according to an ascending order of the associated SL CSI-RS index in each of the $M_{group}$ groups of transmissions. This may be equivalent to a cycling of the set of determined spatial domain filters in each group and a repetition of such a cycling over $M_{group}$ groups. This option may be referred to as "SL CSI-RS index repetition pattern a)" in this document.

In another embodiment shown as Option b) (reference 501), a TX WTRU 503 may perform each SL CSI-RS and PSCCH/PSSCH transmissions in each group using one of the determined spatial domain filters associated with one SL CSI-RS index. This may be equivalent to repetition of one spatial domain filter in each group and cycling of the set of determined spatial domain filters over groups. This option may be referred to as "SL CSI-RS index repetition pattern b)" in this disclosure.

A5.2—SL CSI-RS Transmission Using Type B SL-CSI RS Configuration

In another embodiment, a TX WTRU may determine to use Type B SL CSI-RS resource configuration, e.g., when Type B resource configuration is enabled/configured in a resource pool. In another embodiment, when both Type A and Type B SL CSI-RS resource configurations are enabled/configured in a resource pool, a TX WTRU may determine to use Type B SL CSI-RS resource configuration when the priority of the SL TB does not exceed a (pre)configured threshold (see for example FIG. 7B, 711—No, step 713). A low priority value indicates a high QoS requirement (e.g., priority, reliability, latency, etc.) and therefore a TX WTRU may perform a PSCCH/PSSCH transmission of a SL TB and a SL CSI-RS transmission in the same SL slot using different spatial domain filter. For example, a default spatial domain filter (broad beam) may be used for PSCCH/PSSCH transmission to meet QoS requirements.

A TX WTRU may determine a set of different spatial domain filters ($N_{CSI\text{-}RS\text{-}index}$) to use for SL-CRS transmissions and associate a SL CSI-RS index with each determined spatial domain filter. The $N_{CSI\text{-}RS\text{-}index}$ spatial domain filters may be selected based on WTRU capability, e.g., among the maximum number of supported spatial domain filter $N_{CSI\text{-}RS\text{-}index}$-max. In another embodiment, a WTRU may be (pre)configured with $N_{CSI\text{-}RS\text{-}index}$ in a resource pool.

A WTRU may be (pre)configured with a minimum ($N_{min}$) and maximum re-transmission number ($N_{max}$) for transmissions of a SL TB in a resource pool. $N_{min}$ may be applied when a SL TB is transmitted in a SL slot with SL CSI-RS transmission for a SL TCI state association establishment or update. A TX WTRU may determine a number of SL CSI-RS/PSCCH/PSSCH transmissions ($N_{TX}$) including an initial transmission and re-transmissions of a SL TB according to $N_{TX}=N_{CSI\text{-}RS\text{-}index}\times M_{group}$ where $N_{min}<=N_{TX}<=N_{max}$ and $M_{group}$ is non-zero positive integer.

As discussed in section "SL CSI-RS index", SL CSI-RS and PSCCH/PSSCH transmission are not Quasi-Colocated in Type B SL CSI-RS configuration and thus a TX WTRU may perform sensing for PSCCH/PSSCH transmissions only. A TX WTRU may determine a spatial domain filter associated with a default TCI state to use for each of the $N_{TX}$ PSCCH/PSSHC transmissions. A TX WTRU may perform sensing using this spatial domain filter and obtain a set of available candidate resources for PSCCH/PSSCH transmissions. A TX WTRU may subsequently select a resource from the sensing resource set for a PSCCH/PSSCH transmission.

A TX WTRU may determine a SL CSI-RS resource in terms of both PRB and sequence for SL CSI-RS transmission at the (pre)configured symbols in a SL slot based on the selected PSCCH/PSSCH resource, WTRU source and/or destination ID, priority of the SL TB, SL CSI-RS slot periodicity, SL slot index and the (pre)configured SL CSI-RS PRB and sequence resources discussed in section "SL CSI-RS index".

In one embodiment, the (pre)configured CSI-RS PRB and sequence resource may be indexed and mapped to each sub-channel of a resource pool and as a result, each sub-channel may correspond to one or multiple of SL CSI-RS resources. For each SL CSI-RS transmitted in a SL slot, a TX WTRU may determine the SL CSI-RS resource(s) corresponding to the sub-channel(s) selected for the PSCCH/PSSCH transmission in the same SL slot. A TX WTRU may further select one SL CSI-RS resource using a modular function based on the number of the SL CSI-RS resources corresponding to the PSCCH/PSSCH sub-channels, WTRU source and/destination ID, SL slot index, etc.

Figure 6:
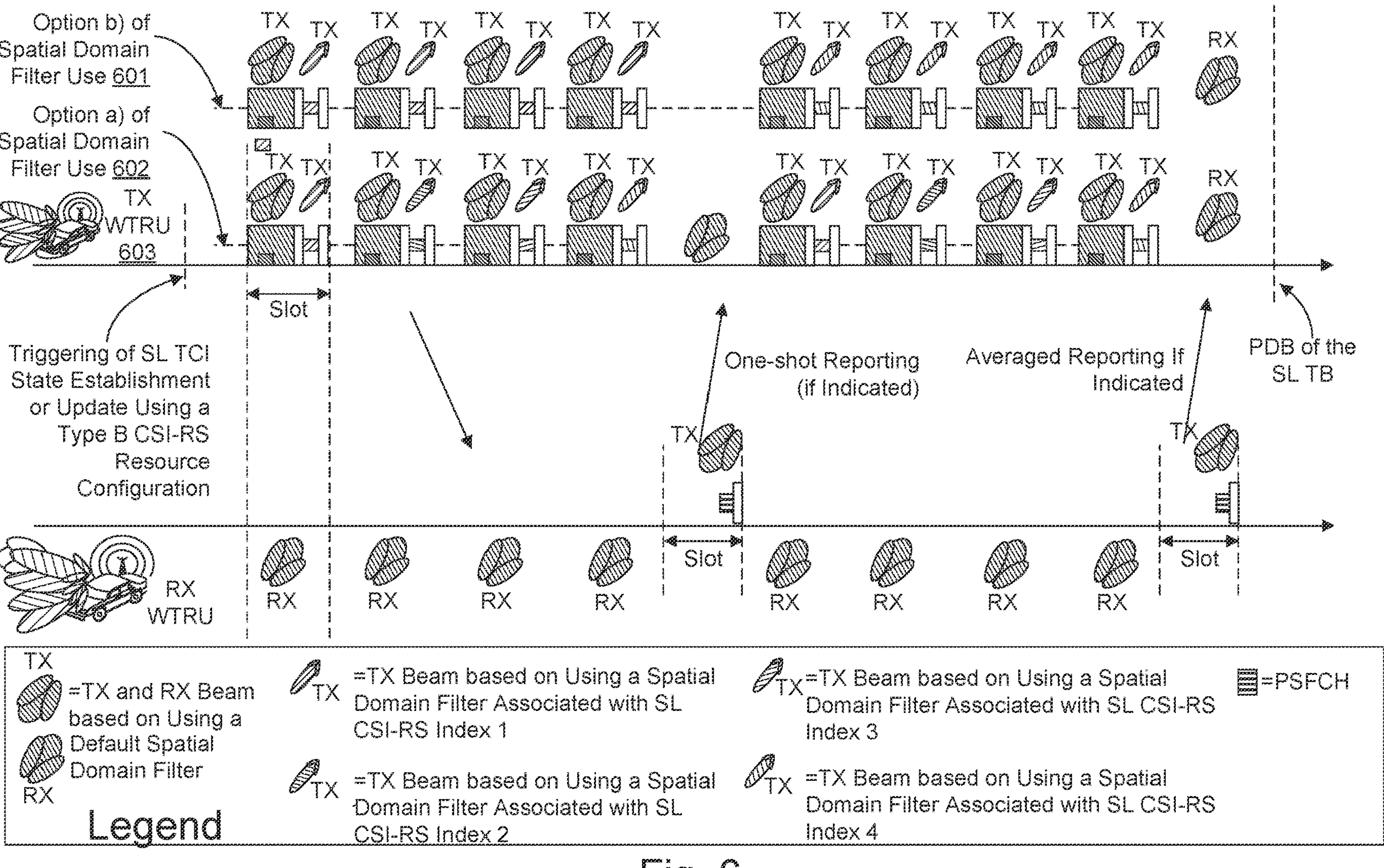
FIG. 6 shows requested SL CSI reporting using Type B SL CSI-RS resource configuration.

A TX WTRU may perform each PSCCH/PSSCH transmission using the spatial domain filter associated with a default SL TCI state. FIG. 6 shows requested SL CSI reporting using Type B SL CSI-RS resource configuration. For SL CSI-RS transmissions, in one embodiment shown as Option a) (reference 602), a TX WTRU 603 may perform each SL CSI-RS transmission based on as SL CSI-RS index repetition pattern a), i.e., using the set of the determined spatial domain filters according to an ascending order of the associated SL CSI-RS index in each of the $M_{group}$ groups of transmissions. This may be equivalent to a cycling of the set of determined spatial domain filters per SL CSI-RS transmission in each group and a repeat of such a sweeping over $M_{group}$ groups.

In another embodiment shown as Option b) (reference 601) a TX WTRU 603 may perform each SL CSI-RS perform each SL CSI-RS transmission based on as SL CSI-RS index repetition pattern b), i.e., in each of the $M_{group}$ groups of transmissions using one of the determined spatial domain filters associated with one SL CSI-RS index. This may be equivalent to repetition of the same spatial domain filter in each group and cycling of the set of determined spatial domain filters per group.

A5.3—SCI Indications for SL CSI Reporting

A TX WTRU may indicate the following information in SCI in a PSCCH transmitted in the same SL slot with the SL CSI-RS transmission for SL TCI state association establishment or update: A SL CSI reporting request for SL TCI state association establishment or update, e.g., a two-bit SCI indicator to indicate at least no SL CSI reporting (no SL CSI-RS transmission with PSCCH/PSSCH transmission in the SL slot), SL CSI reporting for CQI measurement and SL CSI reporting for SL CSI TCI state association measurement; A SL CSI-RS resource configuration type, e.g., a one-bit SCI indicator to indicate either Type A or Type B SL CSI-RS configuration is applied for the SL CSI-RS transmission with the PSCCH/PSSCH transmission in the same SL slot; Number of SL CSI-RS/PSCCH/PSSCH transmissions including the initial transmissions and re-transmissions (NTX), e.g. a SCI indicator of log 2(Nmax); Number of different spatial domain filters used in the N transmission (NCSI-RS-index) and when the number is (pre)configured in a resource pool, this information may not be included in the SCI; A SL CSI-RS index, e.g., a SCI indication of log 2(NCSI-RS-index-max) bits to indicate a SL CSI-RS index associated with the spatial domain filter used for the SL CSI-RS and PSCCH/PSSCH transmission in the SL slot; A SL CSI measurement configuration, e.g., a one-bit SCI indication to indicate either a one-shot or average measurement may be performed.

A5.4—Requested SL CSI Reporting Transmitted in a PSFCH

A TX WTRU may perform SL reception of a PSFCH transmission including the SL CSI reporting information. The SL CSI reporting information may be based on measurements on SL CSI-RS transmission(s) associated with PSFCH transmission. For example, a PSFCH may include a sequence (pre)configured to indicate a SL CSI-RS index of a SL CSI-RS transmission with the highest measured metric (e.g., L1-RSRP). In another embodiment, a PSFCH may include SL CSI-RS index of a SL CSI-RS transmission with the highest measured metric (e.g., L1-RSRP) and additional information such as zone ID, L1-RSRP, WTRU source and/or destination ID, etc. A TX WTRU may attempt to receive a PSFCH transmission using a spatial domain filter associated with a default domain filter as indicated in FIGS. 5 and 6.

A WTRU may determine the time and frequency resource of a PSFCH transmission based on the resource of associated SL CSI-RS transmission(s) and PSFCH resource (pre) configuration. In one embodiment, the PSFCH frequency resource may be a PRB (pre)configured to map to the PRB used by the associated SL CSI-RS transmission in a resource pool.

A WTRU may determine a PSFCH transmission occasion associated with a SL CSI-RS transmission. A PSFCH transmission occasion offset may be (pre)configured in a resource pool in terms of a number of SL slots, e.g., K SL slots, between the end of a SL CSI-RS transmission and the associated PSFCH transmission including the SL CSI reporting based on the SL CSI-RS transmission. Therefore, a PSFCH transmission occasion may be the first slot which includes a (pre)configured PSFCH PRB resource and is at least K slots after the end of the associated SL CSI-RS transmission.

A TX WTRU may attempt to receive a PSFCH transmission at such a PSFCH transmission occasion associated with an SL CSI-RS transmission and in the PSFCH PRB mapped to the PRB used by the SL CSI-RS transmission. When one-shot measurement is indicated in the SCI, a TX WTRU may attempt to perform such a PSFCH reception at a PSFCH transmission association associated with each SL CSI-RS and PSCCH/PSSCH transmission. When average measurement is indicated in the SCI, a TX WTRU may attempt to perform such a PSFCH reception at a PSFCH transmission association associated with the last SL CSI-RS and PSCCH/PSSCH transmission.

A5.5—RX WTRU Measurement of SL CSI-RS Transmissions

A RX WTRU may use a spatial domain filter indicated by a default SL TCI state (as indicated in both FIGS. 5 and 6) to receive a PSCCH/PSCCH transmission. A RX WTRU may decode and receive SCI from the PSCCH including SL identification information of the received SL TB and the information described in section "SCI indications for SL CSI reporting".

A RX WTRU may trigger SL CSI-RS measurement of a SL CSI-RS transmission in the same slot with the PSCCH/PSSCH transmission when a request for a SL CSI reporting for SL CSI TCI state association is indicated in the SCI decoded from the PSCCH and the received SL identification information is (pre)configured for reception (i.e. associated with V2X service and/or applications subscribed by the RX WTRU).

A RX WTRU may determine the value of Mgroup based on NTX and NCSI-RS-index indicated in the received SCI and determine the spatial domain filter(s) to use for measurement of SL CSI-RS transmission within a group. In one embodiment, a RX WTRU may use a spatial domain filter indicated by a default SL TCI state to measure all groups of SL CSI-RS transmissions. In another embodiment, a RX WTRU may use a same set of different spatial domain filters to measure each group of SL CSI-RS transmissions.

Also, when Type B SL CSI-RS resource configuration is indicated in the receive SCI, a RX WTRU may use a spatial domain filter to receive PSCCH/PSSCH transmission (e.g., one indicated by a default TCI state) and switch to a different spatial domain filter during the guard symbol to measure the SL CSI-RS transmission at the next symbols in the SL slot.

When one-shot measurement is indicated in the received SCI, a RX WTRU may perform a SL CSI reporting in a PSFCH transmission when it has performed at least one measurement for each indicated SL CSI-RS index. A RX WTRU may e.g., have measured NCSI-RS-index L1-RSRP values each associated with a different indicated SL CSI-RS index. A RX WTRU may indicate the index of the SL CSI-RS transmission with the highest one-shot measurement metric, e.g., L1-RSRP in a PSFCH transmission. Thus, when a SL CSI-RS measurement of a SL CSI-RS transmission for a one-shot measurement is triggered, a RX WTRU may perform a PSFCH transmission for the SL CSI reporting before the NTX transmissions are completed, e.g., at a PSFCH transmission occasion associated with one of the SL CSI-RS transmissions.

When average measurement is indicated in the received SCI, a RX WTRU may perform a SL CSI reporting in a PSFCH transmission when it has performed measurements on all NTX SL CSI-RS transmissions. A RX WTRU may average the measurements of SL CSI-RS transmissions indicated with the same SL CSI-RS index and identify the index of the SL CSI-RS transmission with the highest averaged measured metric, e.g., L1-RSRP. A RX WTRU may indicate the identified SL CSI-RS index in a PSFCH transmission and perform the PSFCH transmission, when the NTX transmissions are completed, e.g., at a PSFCH transmission occasion associated with the last SL CSI-RS transmissions.

A5.6—TX WTRU Processing of SL CSI Reporting for SL TCI State Association Establishment or Update A TX WTRU may receive a PSFCH transmission and assign the reported SL CSI-RS index to the SL TCI state associated with the SL identification information used in the PSCCH/PSCCH transmission with the SL CSI-RS transmission and update the associated spatial domain filter information. A TX WTRU may set the start value of the association timer as discussed in section "Requested SL SSB reporting for SL TCI state association establishment or update". A TX WTRU thereby may complete an establishment or update of the SL TCI state association.

A TX WTRU may receive a multitude of PSFCH transmissions including CSI reporting for SL CSI-RS transmissions triggered for a SL TCI state association establishment or update. In one embodiment, a TX WTRU may receive SL CSI reporting based on a SL CSI-RS transmission from member WTRUs of a group when the SL identification information indicated in the SCI in the PSCCH transmission in the same slot indicates groupcast and a WTRU destination ID. A such member RX WTRU may transmit a PSFCH in a PRB determined based on a group member ID (pre)configured by higher layers. A TX WTRU may receive different SL CSI-RS index reported by the member RX WTRUs. A TX WTRU may assign all reported SL CSI-RS indices to the SL TCI state associated with SL identification indicated in the SCI and update the associated spatial domain filter information for each SL CSI-RS index. A TX WTRU may set the start value of the association timer as discussed in section "Requested SL SSB reporting for SL TCI state association establishment or update".

A TX WTRU may receive a multitude of PSFCH transmissions including CSI reporting for SL CSI-RS transmissions triggered for a SL TCI state association establishment or update. In one embodiment, a TX WTRU may receive SL CSI reporting based on a SL CSI-RS transmission from member WTRUs of a group when the SL identification information indicated in the SCI in the PSCCH transmission in the same slot indicates groupcast and a WTRU destination ID. A such member RX WTRU may transmit a PSFCH in a PRB determined based on a group member ID (pre)configured by higher layers.

A TX WTRU may receive a set of different SL CSI-RS indices reported from the member RX WTRUs. In one embodiment, a TX WTRU may assign all reported SL CSI-RS indices to the SL TCI state associated with SL identification indicated in the SCI and update the associated spatial domain filter information for each SL CSI-RS index.

In another embodiment, a TX WTRU may determine which reported SL CSI-RS index may be applied to update the SL TCI state and the determination may be based on the following information included in each SL CSI reporting: based on Zone ID, e.g., a TX WTRU may determine a WTRU distance between itself and the RX WTRU performing the SL CSI reporting based on the reported RX WTRU Zone ID and its own Zone ID. When the WTRU distance is below a (pre)configured threshold (e.g., a MCR requirement), a TX WTRU may assign the reported SL CSI-RS index to the SL TCI state and update the associated spatial domain filter; based on SL CSI-RS RSRP, e.g., when reported SL CSI-RS RSRP is below a (pre)configured threshold, a TX WTRU may assign the reported SL CSI-RS index to the SL TCI state and update the associated spatial domain filter.

In another embodiment, a TX WTRU may receive SL CSI reporting from WTRUs (pre)configured to receive broadcast SL TBs with WTRU destination ID indicated in the SCI in the PSCCH transmission in the same slot with the SL CSI-RS transmission. A such RX WTRU may perform a sequence-based PSFCH transmission using a (pre)configured PRB corresponding to a SL CSI RS index. A TX WTRU may determine which SL CSI-RS index to apply to the SL TCI association update when the PSFCH sequence is detected at the corresponding PRB. A TX WTRU may assign all determined SL CSI-RS index to the SL TCI state associated with the broadcast and WTRU destination ID information and update the associated spatial domain filters. A TX WTRU may set the start value of the association timer as discussed in section “Requested SL SSB reporting for SL TCI state association establishment or update”.

In another embodiment, when a TX WTRU does not receive a SL CSI reporting at expected the PSFCH transmission occasion(s), a TX WTRU may report the SL TCI association establishment or update to higher layers.

Figure 7A:
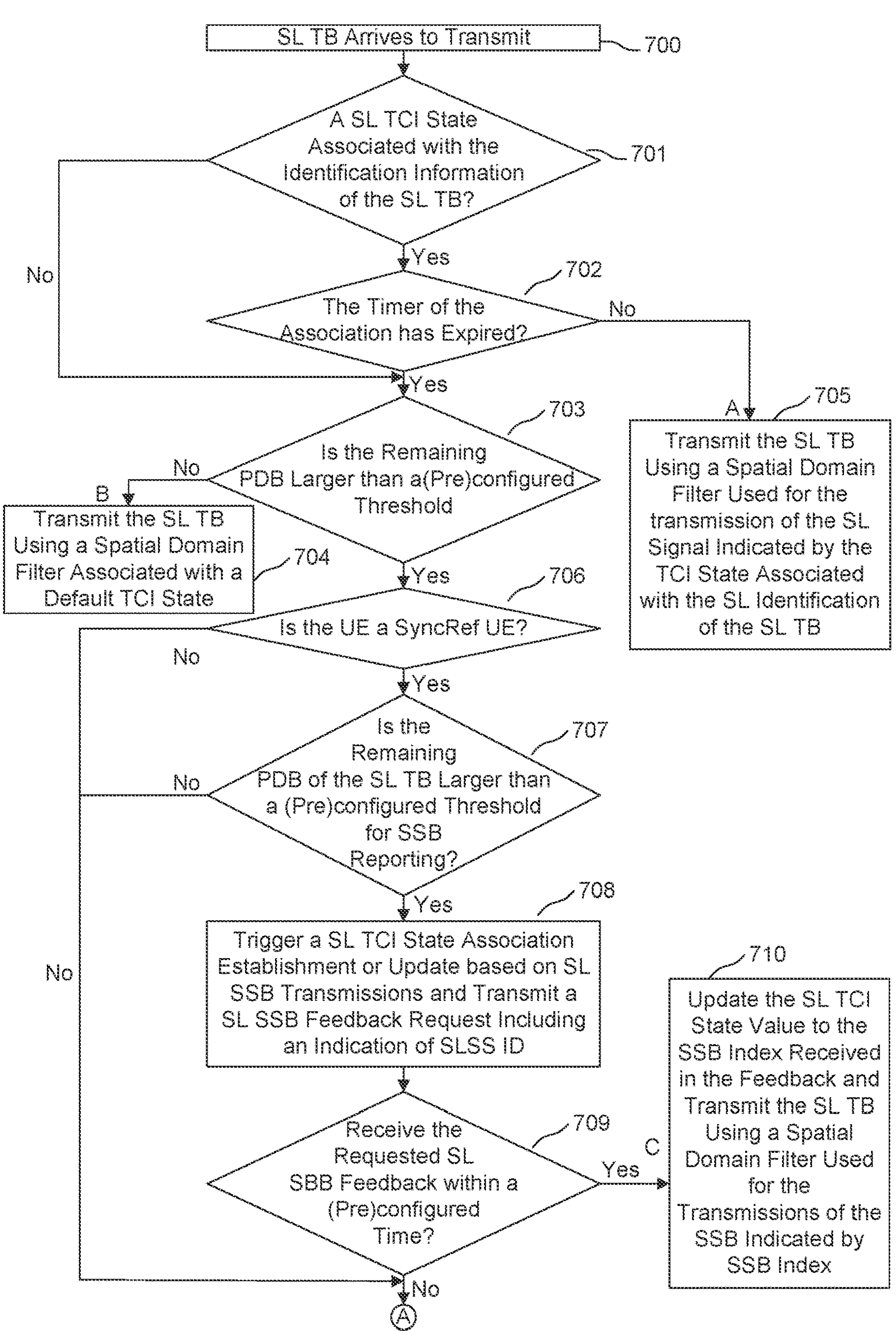
FIGS. 7A and 7B are a flow chart of a method for WTRU determination of spatial domain filter for use for Physical SL Control Channel/Physical SL Shared Channel (PSCCH/PSSCH) transmission of a SL TB.
Figure 7B:
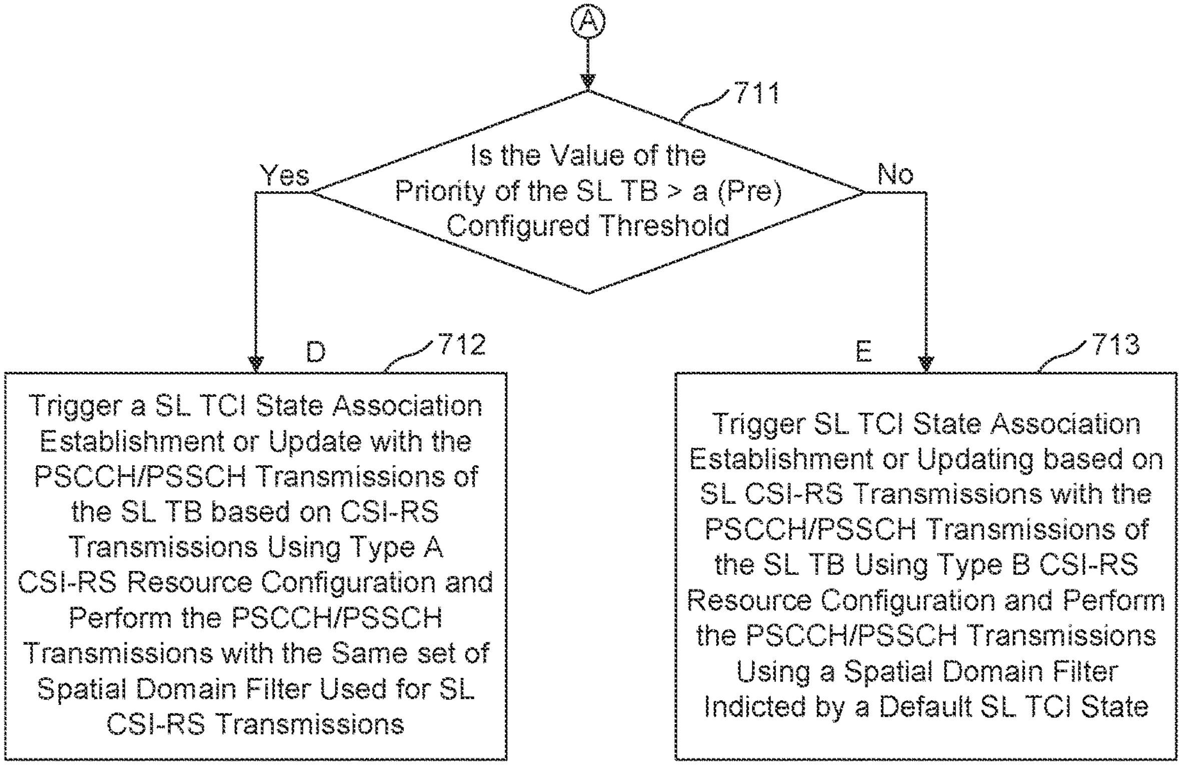

B—WTRU Procedures for Determining a Spatial Domain Filter to Use for a Transmission of a SL TB B1—WTRU Performing PSCCH/PSSCH Transmissions of a SL TB Based on a SL TCI State Associated the SL Identification Information the SL TB FIGS. 7A and 7B are a flow chart of WTRU determination of spatial domain filter for use for Physical SL Control Channel/Physical SL Shared Channel (PSCCH/PSSCH) transmission of a SL TB. A TX WTRU may determine spatial domain filter(s) to use for transmissions of a SL TB 700 as shown based on the SL TCI state association with the SL identification of the SL TB and remaining PDB of the SL TB.

B1.1—Single Beam Unicast Transmission Based on SL TCI State Association

When the association timer of a SL TCI state association with the SL identification information (701) is running, i.e., has not expired (702—No), a TX WTRU may determine a spatial domain filter indicated by the SL TCI state associated with the SL identification information of the SL TB, e.g., a unicast transmission and a pair of WTRU source and destination ID (see block A with reference 705). A TX WTRU may perform sensing using a spatial domain filter based on the spatial domain filter indicated by the associated SL TCI state. For example, a TX WTRU may use the same spatial domain filter or a spatial domain filter that provides a broader coverage with the same angle of departure (AoD) for the sensing.

A TX WTRU may subsequently perform resource selection based on the sensing result for an initial transmission and re-transmission of the SL TB. A TX WTRU may perform the transmissions in the selected resource(s) using the indicated spatial domain filter, i.e., the spatial domain filter used for the last transmission of the SL signal indicated by the associated SL TCI state.

B1.2—Beam Sweeping for Groupcast and Broadcast Transmission Based on SL TCI State Association In another embodiment, when the association timer of a SL TCI state association with the SL identification information is running, i.e., has not expired, and the SL identification of the SL TB indicates a groupcast or broadcast transmission, a TX WTRU may determine a number of spatial domain filters (Nfilter) indicated by the SL TCI state associated with groupcast and the WTRU destination ID. The spatial domain filters may be determined in the SL TCI state as discussed in section “TX WTRU processing of SL CSI reporting for SL TCI state association establishment or update”. A TX WTRU may perform sensing based on each determined spatial domain filter and obtain Y sets of available candidate resources.

A TX WTRU may determine a number of SL CSI-RS/PSCCH/PSSCH transmissions (NTX) including an initial transmission and re-transmissions of the SL TB according to NTX=Nfilter×Mgroup where Mgroup is non-zero positive integer. A TX WTRU may perform each PSCCH/PSSCH transmission using a determined spatial domain filter over Mgroup transmissions.

This may be equivalent to a sweeping of the PSCCH/PSSCH transmission using the set of determined spatial domain filters in one group and a repetition of such a sweeping over Mgroup groups.

In another embodiment, WTRU may perform each PSCCH/PSSCH transmission in each of the Mgroup groups of transmissions using one determined spatial domain filter. This may be equivalent to repetition of each spatial domain filter in one group and cycling of the set of determined spatial domain filters over groups.

B2—WTRU Performing PSCCH/PSSCH Transmission of a SL TB Based on a Default SL TCI State B2.1—Single Beam Unicast, Groupcast or Broadcast Transmission Based on Default SL TCI State In another embodiment, a TX WTRU may determine to apply the default SL TCI state to a PSCCH/PSSCH transmission of a SL TB when the association timer of the SL TCI state associated with SL identification information of the SL TB has expired (702—Yes) and the remaining PDB of the SL TB may be below a (pre)configured threshold (703—No, block B, reference 704). The TX WTRU may not have sufficient time to perform an SL TCI state association update using CSI-RS transmissions with the PSCCH/PSSCH transmission of the SL TB. Thus, a SL TCI state association establishment or update may not be triggered.

A TX WTRU may determine to apply a default SL TCI state for unicast, groupcast or broadcast SL identification information. A TX WTRU may perform sensing using the same spatial domain filter indicated by a default SL TCI state. A TX WTRU may determine a number of PSCCH/PSSCH transmissions (NTX) including an initial transmission and re-transmissions of the SL TB. A TX WTRU may subsequently perform resource selection for each of the NTX transmissions based on the sensing result. A TX WTRU may perform the transmissions in the selected resource(s) using the spatial domain filter indicated by a default SL TCI state.

B3—WTRU Performing PSCCH/PSSCH Transmission of a SL TB Based on Requested SL SSB Reporting for SL TCI State Association Establishment or Update In one embodiment, when a TX WTRU is a SyncRef WTRU (706—Yes) and the remaining PDB of the SL TB is larger than a (pre)configured threshold (707—Yes) and the association timer of the SL TCI state associated with SL identification information of the SL TB has expired (702—Yes), a TX WTRU may determine to perform (trigger) a request SL SSB reporting (see block C, reference 710) using a PSFCH as discussed in Triggering a SL TCI state association establishment or update based on received periodic SL SSB reporting. A TX WTRU may perform the request transmission 708 using a spatial domain filter indicated by a default TCI state. The request may be included in a SCI in PSCCH/PSSCH transmission. In another embodiment, a MAC CE may be applied.

When a SyncRef TX WTRU receives a requested SSB reporting (709—Yes), it may set the value of the SL TCI state associated with the SL identification information of the SL TB to the reported SSB index and set the start value of the association timer as discussed in section "Requested SL SSB reporting for SL TCI state association establishment or update". Subsequently, a TX WTRU may perform transmissions of the SL TB as described in section "WTRU performing PSCCH/PSSCH transmission of a SL TB based on a SL TCI state associated the SL identification information the SL TB".

When a SyncRef TX WTRU does not receive a request SSB reporting within a (pre)configured time (709—No), a SyncRef TX WTRU may determine to perform transmissions of the SL TB according to the section "WTRU performing PSCCH/PSSCH transmission of a SL TB with a SL CSI-RS transmission triggered for SL TCI state association establishment or update".

B4—WTRU Performing PSCCH/PSSCH Transmission of a SL TB with a SL CSI-RS Transmission Triggered for SL TCI State Association Establishment or Update In another embodiment, when a TX WTRU is not a SyncRef WTRU (706—No) and the remaining PDB of the SL TB is larger than a (pre)configured threshold (703—Yes), a TX WTRU may trigger a SL TCI state association establishment or update and perform PSCCH/PSSCH transmissions of the SL TB with the triggered SL CSI-RS transmissions (see blocks D (reference 712) and E (reference 713)) as discussed in "Requested SL CSI reporting for SL TCI state association establishment or update".

C—WTRU Procedures for Determining a Spatial Domain Filter to Use for a Reception of a SL TB C1—WTRU Performing PSCCH/PSSCH Reception of a SL TB Based on a SL TCI State Associated with the SL Identification Information of the SL TB A RX WTRU may receive a PSCCH/PSSCH transmission of a SL TB in SL slot n and the SCI in the PSCCH transmission may indicate reservation of resource(s) for a re-transmission of the same SL TB or a transmission of a new SL TB. The resource(s) reserved for a re-transmission may be indicated within the SL slot n+T where T is a gap in terms of SL slot for a re-transmission and SL slot n+TRSVP where TRSVP is the reservation interval indicated in the SCI. A RX WTRU may associate such a SL slot including previously reserved resources with the SL identification information (cast type, WTRU source and/or destination ID) indicated in the SCI reserving the resources.

For reception in a SL slot with an association with SL identification information, a RX WTRU may determine to use a spatial domain filter indicated by a SL TCI state associated with the SL identification information coupling with the SL identification information associated with the SL slot. For a unicast link, the coupling SL identification information may be the two pairs of WTRU source and destination IDs (pre)configured to the two WTRUs of the unicast link. For a group or broadcast link, the coupling SL identification information may be the same WTRU destination ID.

In another embodiment, a RX WTRU may associate such a SL slot including previously reserved resources with a SL TCI state associated with the coupling SL identification information. A RX WTRU may determine to use a spatial domain filter indicated by the associated SL TCI state to receive the reserved transmission.

C2—WTRU Performing PSCCH/PSSCH Reception Based on a Default SL TCI State

In a SL slot without an association with SL identification information, a RX WTRU may determine to use a spatial domain filter indicated by a default SL TCI state. This is to enable the RX WTRU to receive from a broad spatial coverage, as the RX WTRU is not aware from which direction it may receive a transmission.

C3—WTRU Prioritization in a SL Slot Associated with Conflicting SL TCI State

A WTRU may receive multiple PSCCH/PSSCH resource reservations for SL TBs with different SL identification information that may reserve resources in the same SL slot. A WTRU may associate the SL slot with multiple SL identification information indicated in the SCI reserving the resources or SL TCI states associated with multiple coupling SL identification information.

When the spatial coverage of the spatial domain filters do not overlap, a RX WTRU may not simultaneously apply such different spatial domain filter in one SL slot to receive SL TBs from different WTRUs. Such a conflict resulted from using different spatial domain filters to receive from different WTRUs may be referred to as spatial conflict in this document. A spatial conflict may occur when multiple transmissions arrive at non- or partial-overlapping angle of arrival (AoA). A RX WTRU may determine such a spatial conflict between receptions based on the configuration of the associated spatial domain filter.

In one embodiment, when a RX WTRU determines a spatial conflict, a RX WTRU may perform a prioritization based on the priorities indicated in the SCIs reserving the resources in the SL slot. A RX WTRU may use the spatial domain filter associated the SL identification of a SL TB with the highest priority (711—Yes, step 712). In case of multiple SL TBs with the highest priority, a RX WTRU may randomly select one of the SL TB and perform reception in the SL slot using the spatial domain filter associated with the SL identification information of the SL TB. In another embodiment, a RX WTRU may perform a reception in the SL slot using a spatial domain filter indicated by a default TCI state. Also, a RX WTRU may perform a PSFCH transmission to indicate the spatial conflict to one or multiple of the TX WTRUs. A RX WTRU may indicate the type of the conflict in the PSFCH and request a resource reselection in a different SL slot.

D—WTRU Procedures for Determining a Spatial Domain Filter of a HARQ Feedback Transmission D1—WTRU Determination of a SL TCI State Associated with a PSFCH Transmission A RX WTRU may determine to use a spatial domain filter for a PSFCH transmission carrying a HARQ feedback based on the SL TCI state associated with the SL identification information coupling with the SL identification of the SL TB received in the PSSCH corresponding to the HARQ feedback when the HARQ feedback is HARQ ACK. As PSCCH/PSSCH is received correctly, a RX WTRU may consider the same spatial domain filter to receive may be used for the transmission to the TX WTRU.

When the HARQ feedback is HARQ NACK, a RX WTRU may consider the same spatial domain filter to receive may be not be optimal for the transmission to the TX WTRU. A RX WTRU may determine to use a spatial domain filter indicated by a default TCI state for the PSFCH transmission of HARQ NACK. In another embodiment, a RX WTRU may use a set of (pre)configured spatial domain filter for the PSFCH transmission of NACK.

D2—WTRU Prioritization for Transmitting Multiple PSFCH Transmissions with Conflicting SL TCI State When the spatial coverage of different spatial domain filters determined for PSFCH transmissions in the same SL slot do not overlap, a TX WTRU may not simultaneously perform these PSFCH transmissions. A spatial conflict may occur when multiple transmissions are performed at non- or partial-overlapping angle of departure (AoD). A TX WTRU may determine such a spatial conflict between PSFCH transmissions based on the configuration of the associated spatial domain filter.

In one embodiment, when a TX WTRU determines such a conflict, a TX WTRU may perform a prioritization based on the priorities indicated in the SCIs associated with the PSSCH transmission corresponding to the HARQ feedback. A TX WTRU may perform a PSFCH transmission associated with a SL TB with the highest priority. In case of multiple SL TBs with the highest priority, a TX WTRU may randomly select one of the corresponding PSFCH transmissions. In another embodiment, a TX WTRU may perform all PSFCH transmissions in the SL slot using a spatial domain filter indicated by a default TCI state.

Figure 8:
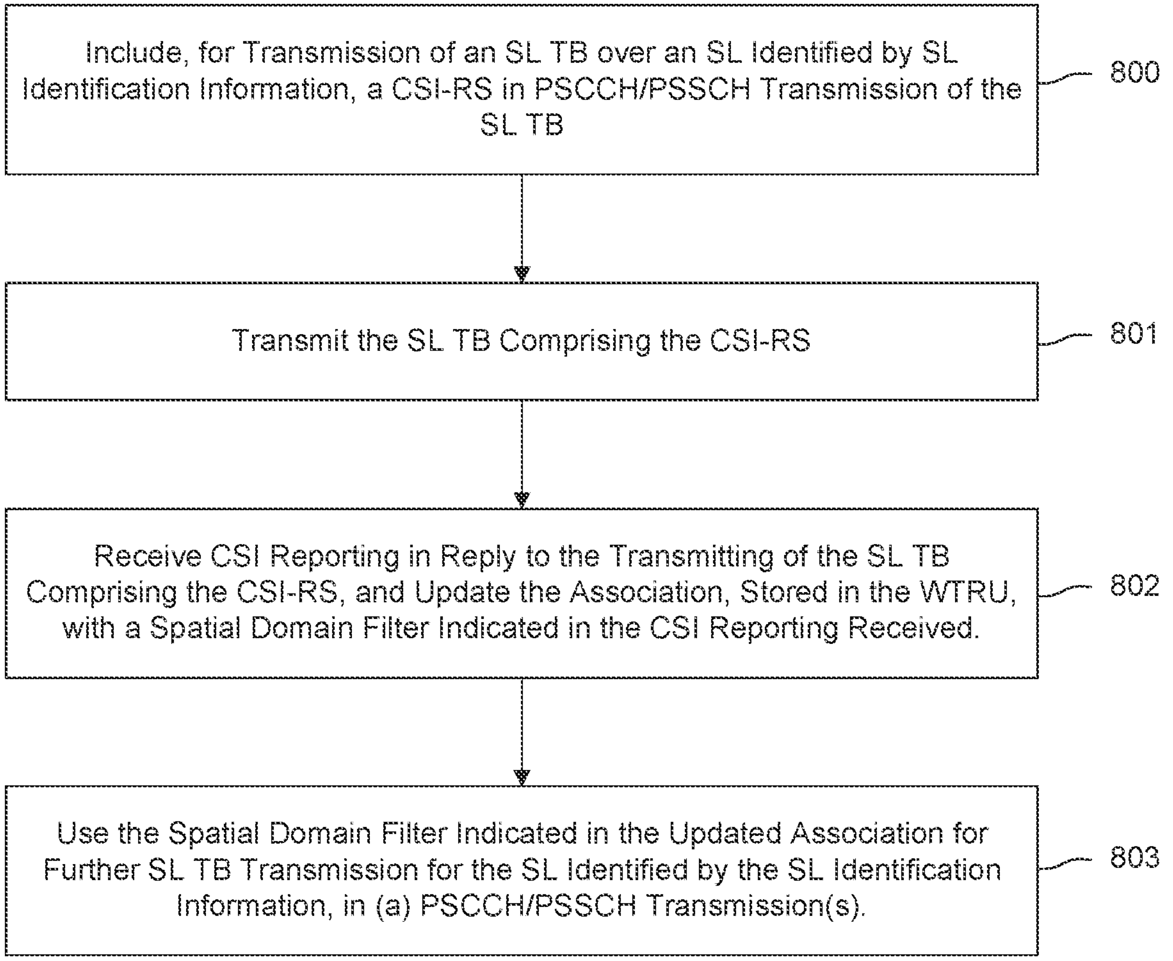
FIG. 8 is a flow chart of a further method for WTRU determination of a spatial domain filter to use for PSCCH/PSSCH transmission of a SL TB.

FIG. 8 is a flow chart of an embodiment of a method for determining a spatial domain filter to use for SL transmission. The method may be implemented by a WTRU. In 800, for transmission of an SL Transmission Block (TB) over a SL identified by SL identification information, a Channel State Information Reference Signal (CSI-RS) is included in a Physical SL Control Channel/Physical SL Shared Channel (PSCCH/PSSCH) transmission of the SL TB. This is done with an objective to establish or to update an association, stored in the WTRU, between a SL Transmission Configuration Information (TCI) state and a spatial domain filter to use for further transmissions over the SL identified by the SL identification information. In 801, the TB comprising the CSI-RS is transmitted. In 802, a CSI reporting is received in reply to the transmission of the TB including the CSI-RS. Further in 802, the association stored in the WTRU is updated, with a spatial domain filter indicated in the CSI reporting received. In 803, the spatial domain filter indicated in the updated association stored in the WTRU is used for further SL TB transmissions for the SL identified by the SL identification information, in (a) PSCCH/PSSCH transmission(s).

According to an embodiment of the method for determining a spatial domain filter to use for SL transmission, the including of the CSI-RS in a PSCCH/PSSCH transmission of the SL TB is triggered based on at least one of: a value of a timer associated with the association stored in the WTRU; a remaining Packet Delay Budget (PDB) of the SL TB; receipt of a SL CSI update request; receipt of Hybrid Automatic Repeat Request (HARQ) feedback.

According to an embodiment of the method for determining a spatial domain filter to use for SL transmission, further comprising determining time and frequency resource for the including of the CSI-RS in the PSCCH/PSSCH transmission, based on at least one of: a priority of the SL TB to transmit; a source and/or destination identifier comprised in the SL identification information; a PSCCH/PSSCH transmission slot index for the PSCCH/PSSCH transmission of the SL TB; an index number of the CSI-RS; a measurement type of the CSI-RS.

According to an embodiment of the method for determining a spatial domain filter to use for SL transmission, a value of the timer is based on at least one of: a Quality of Service requirement corresponding to a source and/or destination identifier comprised in the SL identification information; a Minimum Communication Range (MCR) requirement corresponding to a source and/or destination identifier comprised in the SL identification information; Reference Signal Received Power; a distance between the WTRU and another WTRU identified by a destination identifier comprised in the SL identification information.

The present also discloses a Wireless Transmit-Receive Unit (WTRU), comprising at least one processor (comprising circuitry comprising at least one processor, a memory and a transmitter-receiver), the at least one processor being configured to (the circuitry being configured to): include, for transmission (e.g., by the transmitter-receiver) of an SL Transmission Block (TB) over a SL identified by SL identification information, a Channel State Information Reference Signal (CSI-RS) in a Physical SL Control Channel/Physical SL Shared Channel (PSCCH/PSSCH) transmission of the SL TB, for establishing or updating an association stored in the WTRU between a SL Transmission Configuration Information (TCI) state and a spatial domain filter to use for further transmissions over the SL; transmit (e.g., by the transmitter-receiver) the TB comprising the CSI-RS; receive (e.g., by the transmitter-receiver), in reply to the transmission of the TB including the CSI-RS, a CSI reporting, and update the association stored in the WTRU (e.g., in the memory) with a spatial domain filter indicated in the CSI reporting; and for further SL TB transmissions for the SL identified by the SL identification information, transmit (e.g., by the transmitter-receiver) the further SL TB in a PSCCH/PSSCH transmission using the spatial domain filter indicated in the updated association stored.

According to an embodiment of the WTRU, the at least one processor is further configured to trigger the inclusion of the CSI-RS in a PSCCH/PSSCH transmission of the SL TB based on at least one of: a value of a timer associated with the association stored in the WTRU; a remaining Packet Delay Budget (PDB) of the SL TB to transmit; receipt of a SL CSI update request; receipt of Hybrid Automatic Repeat Request (HARQ) feedback.

According to an embodiment of the WTRU, the at least one processor (or the circuitry) is further configured to determine time and frequency resource of the CSI-RS inclusion in the PSCCH/PSSCH transmission, based on at least one of a priority of the SL TB to transmit; a source and/or destination identifier comprised in the SL identification information; a PSCCH/PSSCH transmission slot index for the PSCCH/PSSCH transmission of the SL TB; an index number of the CSI-RS; a measurement type of the CSI-RS.

According to an embodiment of the WTRU, a value of the timer is based on at least one of: a Quality of Service requirement corresponding to a source and/or destination identifier comprised in the SL identification information; a Minimum Communication Range (MCR) requirement corresponding to a source and/or destination identifier comprised in the SL identification information; Reference Signal Received Power; A distance between the WTRU and another WTRU identified by a destination identifier comprised in the SL identification information.

Figure 9:
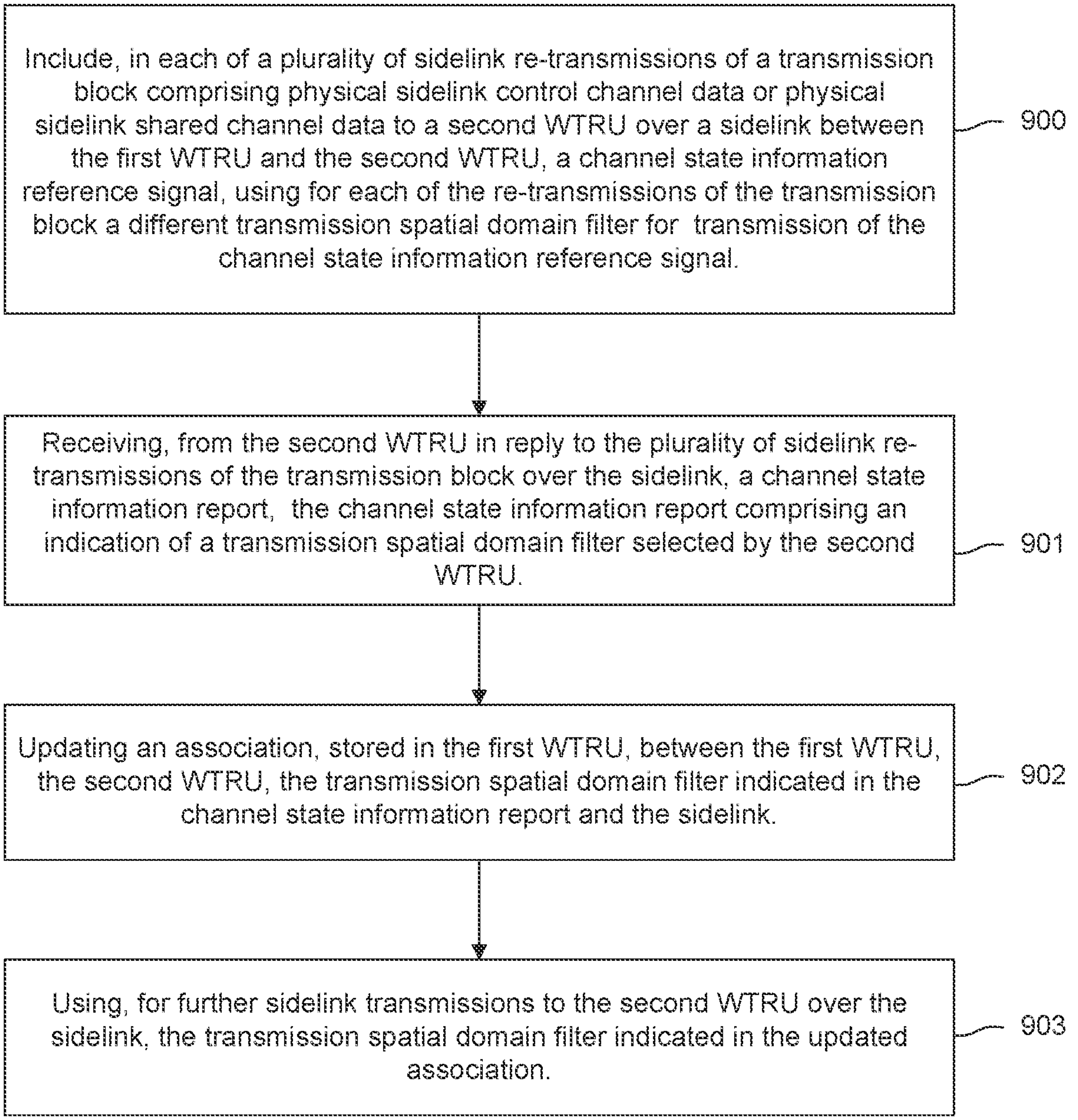
FIG. 9 is a flow chart of a method for establishment of an SL TCI state association.

FIG. 9 is a flow chart of an embodiment of a method, implemented by a first WTRU, for establishment of an SL TCI state association.

In 900, the method comprises including, in each of a plurality of sidelink re-transmissions of a transmission block comprising physical sidelink control channel data or physical sidelink shared channel data to a second WTRU over a sidelink between the first WTRU and the second WTRU, a channel state information reference signal; and for each of the plurality of sidelink re-transmissions of the transmission block over the sidelink, the channel state information reference signal is transmitted according to a different transmission spatial domain filter. In 901, the method comprises receiving, from the second WTRU in reply to the plurality of sidelink re-transmissions of the transmission block over the sidelink, a channel state information report, the channel state information report comprising an indication of a transmission spatial domain filter selected by the second WTRU. In 902, the method comprises updating an association, stored in the first WTRU, between the first WTRU, the second WTRU, the transmission spatial domain filter indicated in the channel state information report and the sidelink. In 903, the method comprises using, for further sidelink transmissions to the second WTRU over the sidelink, the transmission spatial domain filter indicated in the updated association.

According to an embodiment of the method, the transmission block comprises an identifier of the first WTRU and an identifier of the second WTRU, and wherein the association between the first WTRU, the second WTRU, the transmission spatial domain filter indicated in the channel state information report and the sidelink is based on the identifier of the first WTRU and the identifier of the second WTRU.

According to an embodiment of the method, the channel state information reference signal comprises an index of a transmission spatial domain filter with which the channel state information reference signal is transmitted, and wherein the indication of the transmission spatial domain filter selected by the second WTRU comprises an index of the transmission spatial domain filter selected by the second WTRU.

According to an embodiment of the method, the including is triggered based on at least one of an expiry of an association duration associated with the association stored in the first WTRU; a remaining packet delay budget of the transmission block dropping below a threshold; a receipt of a sidelink channel state information update request; a receipt of hybrid automatic repeat request feedback.

According to an embodiment, the method includes determining a time and frequency resource for the including of the channel state information reference signal as a function of at least one of: a priority of the transmission block; a sidelink slot index for the sidelink re-transmissions of the transmission block; an index number of the channel state information reference signal; a measurement type of the channel state information reference signal.

According to an embodiment, the association duration is based on at least one of: a quality of service requirement; a minimum communication range requirement; a reference signal received power; a distance between the first WTRU and the second WTRU.

There is also disclosed and described an embodiment of a first WTRU, comprising at least one processor. The at least one processor is configured to include, in each of a plurality of sidelink re-transmissions of a transmission block comprising physical sidelink control channel data or physical sidelink shared channel data to a second WTRU over a sidelink between the first WTRU and the second WTRU, a channel state information reference signal. The at least one processor is further configured to use, for each of the plurality of sidelink re-transmissions of the transmission block over the sidelink, a different transmission spatial domain filter for transmission of the channel state information reference signal. The at least one processor is configured to receive, from the second WTRU in reply to the plurality of sidelink re-transmissions of the transmission block over the sidelink, a channel state information report, the channel state information report comprising an indication of a transmission spatial domain filter selected by the second WTRU. The at least one processor is configured to update an association, stored in the first WTRU, between the first WTRU, the second WTRU, the transmission spatial domain filter indicated in the channel state information report and the sidelink. The at least one processor is configured to use, for further sidelink transmissions to the second WTRU over the sidelink, the transmission spatial domain filter indicated in the updated association.

According to an embodiment, the at least one processor is configured to include, in the transmission block, an identifier of the first WTRU and an identifier of the second WTRU, and wherein the association between the first WTRU, the second WTRU, the transmission spatial domain filter indicated in the channel state information report and the sidelink is based on the identifier of the first WTRU and the identifier of the second WTRU.

According to an embodiment, the at least one processor is configured to comprise, with the channel state information reference signal, an index of a transmission spatial domain filter with which the channel state information reference signal is transmitted. According to an embodiment, the indication of the transmission spatial domain filter selected by the second WTRU comprises an index of the transmission spatial domain filter selected by the second WTRU.

According to an embodiment, the at least one processor is configured to trigger the include based on at least one of: an expiry of an association duration associated with the association stored in the first WTRU; a remaining packet delay budget of the transmission block dropping below a threshold; a receipt of a sidelink channel state information update request; a receipt of hybrid automatic repeat request feedback.

According to an embodiment, the at least one processor is configured to determine a time and frequency resource for including the channel state information reference signal as a function of at least one of: a priority of the transmission block; a sidelink slot index for the sidelink re-transmissions of the transmission block; an index number of the channel state information reference signal; a measurement type of the channel state information reference signal.

According to an embodiment, the at least one processor is configured to base the association duration on at least one of: a quality of service requirement; a minimum communication range requirement; a reference signal received power; a distance between the first WTRU and the second WTRU.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "WTRU", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented by a first wireless transmit-receive unit (WTRU), the method comprising:

transmitting a first plurality of sidelink (SL) transmissions comprising first physical sidelink control channel (PSCCH) data, first physical sidelink shared channel (PSSCH) data, and a first channel state information reference signal (CSI-RS) to a second WTRU over an SL between the first WTRU and the second WTRU, wherein, for each of the first plurality of SL transmissions, the first PSCCH data and the first PSSCH data is transmitted according to a default transmission spatial domain filter and the first CSI-RS is transmitted according to a transmission spatial domain filter different for each of the first plurality of SL transmissions;

receiving, from the second WTRU, a channel state information (CSI) report, the CSI report comprising an indication of a transmission spatial domain filter selected by the second WTRU from one of the different transmission spatial domain filters used for transmitting the first CSI-RS;

updating an association between the first WTRU, the second WTRU, and the transmission spatial domain filter indicated in the CSI report; and transmitting a second plurality of SL transmissions comprising second PSCCH data, second PSSCH data, and a second CSI-RS to the second WTRU over the SL between the first WTRU and the second WTRU, wherein, for each of the second plurality of SL transmissions, the second PSCCH data and the second PSSCH data is transmitted according to the default transmission spatial domain filter and the second CSI-RS is transmitted according to the transmission spatial domain filter of the updated association.

2. The method according to claim 1, wherein the association is indicated by an SL transmission control state.

3. The method according to claim 2, wherein the SL transmission control state is a transmission configuration indication state.

4. The method according to claim 1, wherein the association is based on an identifier of the first WTRU and an identifier of the second WTRU.

5. The method according to claim 4, wherein the association is per cast type of the SL, and wherein the cast type is one of: unicast, groupcast, or broadcast.

6. The method according to claim 1, wherein the first CSI-RS comprises an index of a transmission spatial domain filter with which the first CSI-RS is transmitted, and wherein the indication of the transmission spatial domain filter selected by the second WTRU comprises an index of the transmission spatial domain filter selected by the second WTRU.

7. The method according to claim 1, wherein the transmitting of the first plurality of SL transmissions is triggered based on at least one of:

an expiry of an association duration of the association between the first WTRU, the second WTRU and the transmission spatial domain filter;

a remaining packet delay budget of a transmission block, comprising PSCCH data and PSSCH data for SL transmission, dropping below a threshold;

a receipt of an SL CSI update request; and a receipt of hybrid automatic repeat request feedback.

8. The method according to claim 7, wherein the association duration is based on at least one of:

a quality of service requirement;

a minimum communication range requirement;

a reference signal received power; and a distance between the first WTRU and the second WTRU.

9. A first wireless transmit-receive unit (WTRU) comprising at least one processor configured to:

transmit a first plurality of sidelink (SL) transmissions comprising first physical sidelink control channel (PSCCH) data, first physical sidelink shared channel (PSSCH) data, and a first channel state information reference signal (CSI-RS) to a second WTRU over an SL between the first WTRU and the second WTRU, wherein, for each of the first plurality of SL transmissions, the first PSCCH data and the first PSSCH data is transmitted according to a default transmission spatial domain filter and the first CSI-RS is transmitted according to a transmission spatial domain filter different for each of the first plurality of SL transmissions;

receive, from the second WTRU, a channel state information (CSI) report, the CSI report comprising an indication of a transmission spatial domain filter selected by the second WTRU from one of the different transmission spatial domain filters used for transmitting the first CSI-RS;

update an association between the first WTRU, the second WTRU, and the transmission spatial domain filter indicated in the CSI report; and transmit a second plurality of SL transmissions comprising second PSCCH data, second PSSCH data, and a second CSI-RS to the second WTRU over the SL between the first WTRU and the second WTRU, wherein, for each of the second plurality of SL transmissions, the second PSCCH data and second PSSCH data is transmitted according to the default transmission spatial domain filter and the second CSI-RS is transmitted according to the transmission spatial domain filter of the updated association.

10. The first WTRU according to claim 9, wherein the association is indicated by an SL transmission control state.

11. The first WTRU according to claim 10, wherein the transmission control state is a transmission configuration indication state.

12. The first WTRU according to claim 9, wherein the association is based on an identifier of the first WTRU and an identifier of the second WTRU.

13. The first WTRU according to claim 12, wherein the association is per cast type of the SL, and wherein the cast type is one of: unicast, groupcast, or broadcast.

14. The first WTRU according to claim 9, wherein the first CSI-RS comprises an index of a transmission spatial domain filter with which the first CSI-RS is transmitted, and wherein the indication of the transmission spatial domain filter selected by the second WTRU comprises an index of the transmission spatial domain filter selected by the second WTRU.

15. The first WTRU according to claim 9, wherein the at least one processor is configured to trigger transmission of the first plurality of SL transmissions based on at least one of:

an expiry of an association duration of the association between the first WTRU, the second WTRU, and the transmission spatial domain filter;

a remaining packet delay budget of a transmission block, comprising PSCCH data and PSSCH data for SL transmission, dropping below a threshold;

a receipt of an SL CSI update request; and a receipt of hybrid automatic repeat request feedback.

* * * * *